(12) United States Patent
Ryll et al.

(10) Patent No.: US 11,237,572 B2
(45) Date of Patent: Feb. 1, 2022

(54) COLLISION AVOIDANCE SYSTEM, DEPTH IMAGING SYSTEM, VEHICLE, MAP GENERATOR AND METHODS THEREOF

(71) Applicant: Intel Corporation, Santa Clara, CA (US)

(72) Inventors: Andre Ryll, Gilching (DE); Daniel Pohl, Puchheim (DE); Markus Achtelik, Woerthsee (DE); Bastian Jaeger, Munich (DE); Jan Willem Vervoorst, Gauting (DE)

(73) Assignee: INTEL CORPORATION, Santa Clara, CA (US)

( * ) Notice: Subject to any disclaimer, the term of this patent is extended or adjusted under 35 U.S.C. 154(b) by 219 days.

(21) Appl. No.: 16/233,236

(22) Filed: Dec. 27, 2018

(65) Prior Publication Data

US 2019/0138029 A1 May 9, 2019

(51) Int. Cl.
*G05D 1/10* (2006.01)
*G06T 7/50* (2017.01)
(Continued)

(52) U.S. Cl.
CPC ........... *G05D 1/101* (2013.01); *B64C 39/024* (2013.01); *B64D 47/08* (2013.01); *G05D 1/0055* (2013.01);
(Continued)

(58) Field of Classification Search
CPC .................................................... G05D 1/101
See application file for complete search history.

(56) References Cited

U.S. PATENT DOCUMENTS

| 10,269,257 B1* | 4/2019 | Gohl ......................... G06T 5/00 |
| 2008/0189036 A1 | 8/2008 | Elgersma |

(Continued)

FOREIGN PATENT DOCUMENTS

| KR | 101736089 B1 | 5/2017 |
| WO | 2017222542 A1 | 12/2017 |

OTHER PUBLICATIONS

Hornung, Armin et al., "OctoMap—An Efficient Probabilistic 3D Mapping Framework Based on Octrees", 2013, University of Freiburg, Germany, retrieved on Dec. 24, 2018, https://octomap.github.io/.
(Continued)

*Primary Examiner* — Imran K Mustafa
(74) *Attorney, Agent, or Firm* — Viering, Jentschura & Partner mbB

(57) ABSTRACT

According to various aspects, a collision avoidance method may include: receiving depth information of one or more depth imaging sensors of an unmanned aerial vehicle; determining from the depth information a first obstacle located within a first distance range and movement information associated with the first obstacle; determining from the depth information a second obstacle located within a second distance range and movement information associated with the second obstacle, the second distance range is distinct from the first distance range, determining a virtual force vector based on the determined movement information, and controlling flight of the unmanned aerial vehicle based on the virtual force vector to avoid a collision of the unmanned aerial vehicle with the first obstacle and the second obstacle.

20 Claims, 20 Drawing Sheets

(51) Int. Cl.
  *B64C 39/02*   (2006.01)
  *B64D 47/08*   (2006.01)
  *G05D 1/00*    (2006.01)

(52) U.S. Cl.
  CPC .......... *G06T 7/50* (2017.01); *B64C 2201/141* (2013.01); *G06T 2207/10032* (2013.01); *G06T 2207/30252* (2013.01)

(56) References Cited

U.S. PATENT DOCUMENTS

2017/0193830 A1*  7/2017  Fragoso ................. G05D 1/102
2018/0237148 A1   8/2018  Hehn et al.
2019/0049968 A1*  2/2019  Dean .................... G05D 1/0088
2019/0138029 A1   5/2019  Ryll et al.

OTHER PUBLICATIONS

2018 GitHub, Inc. shiritbrook, "D400 Series Visual Presets", Jul. 21, 2018, retrieved on Dec. 24, 2018, https://github.com/IntelRealSense/librealsense/wiki/D400-Series-Visual-Presets.
International Search Report issued for the corresponding PCT-Application No. PCT/US2019/061905, dated Mar. 12, 2020, 11 pages (for informational purpose only).

* cited by examiner

FIG. 4
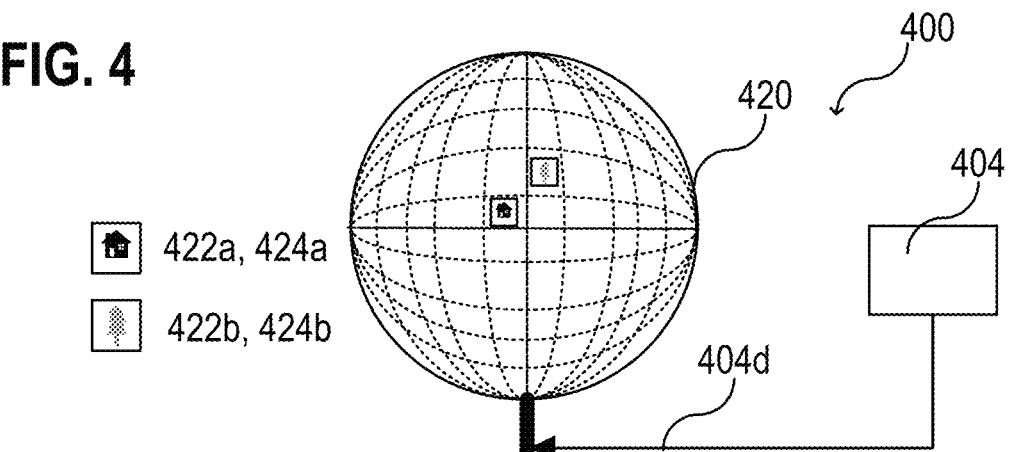
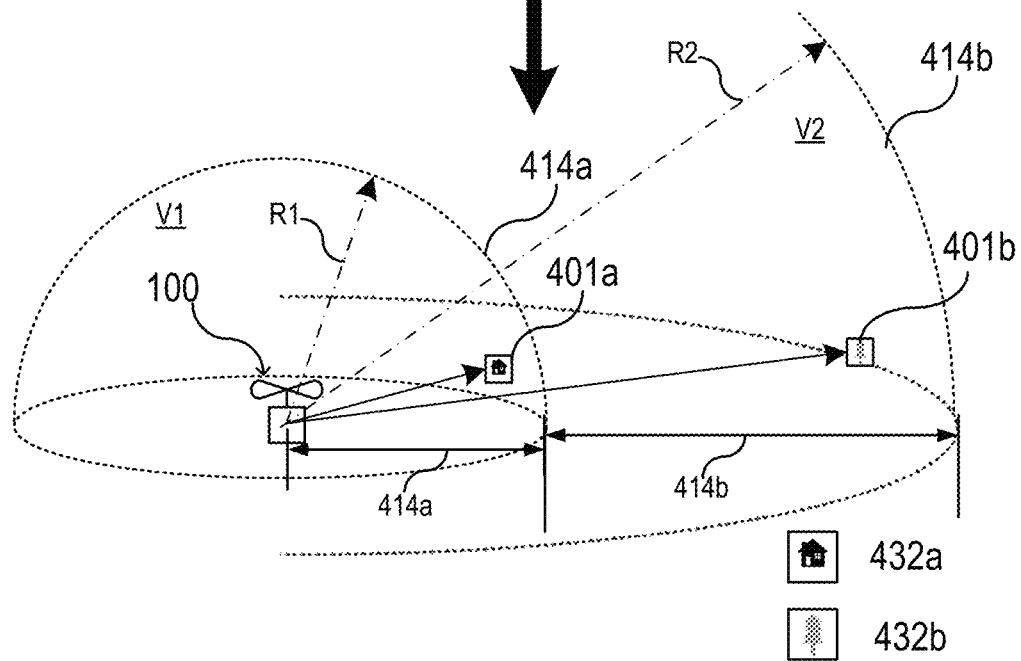
FIG. 5
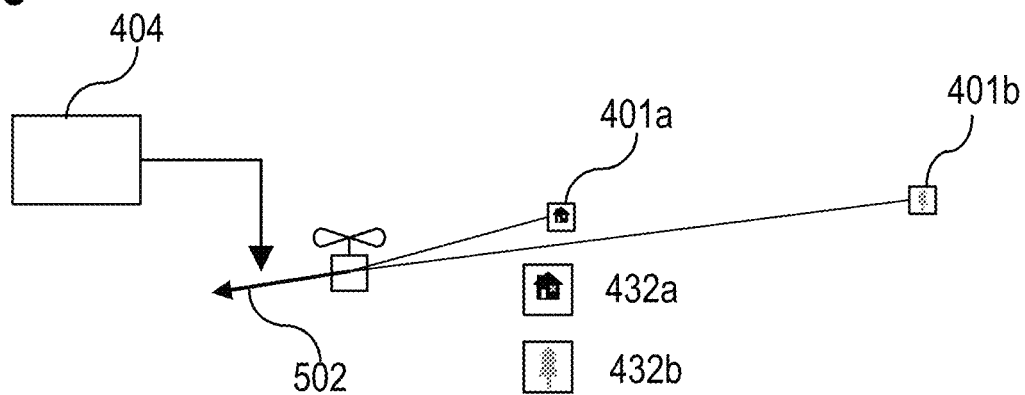

1110: Generating a voxel map based on one or more depth images

1120: Determining an occupancy value for one or more voxel positions of the voxel map, the respective occupancy value representing a probability of presence of an obstacle at an absolute position corresponding to the respective voxel map position

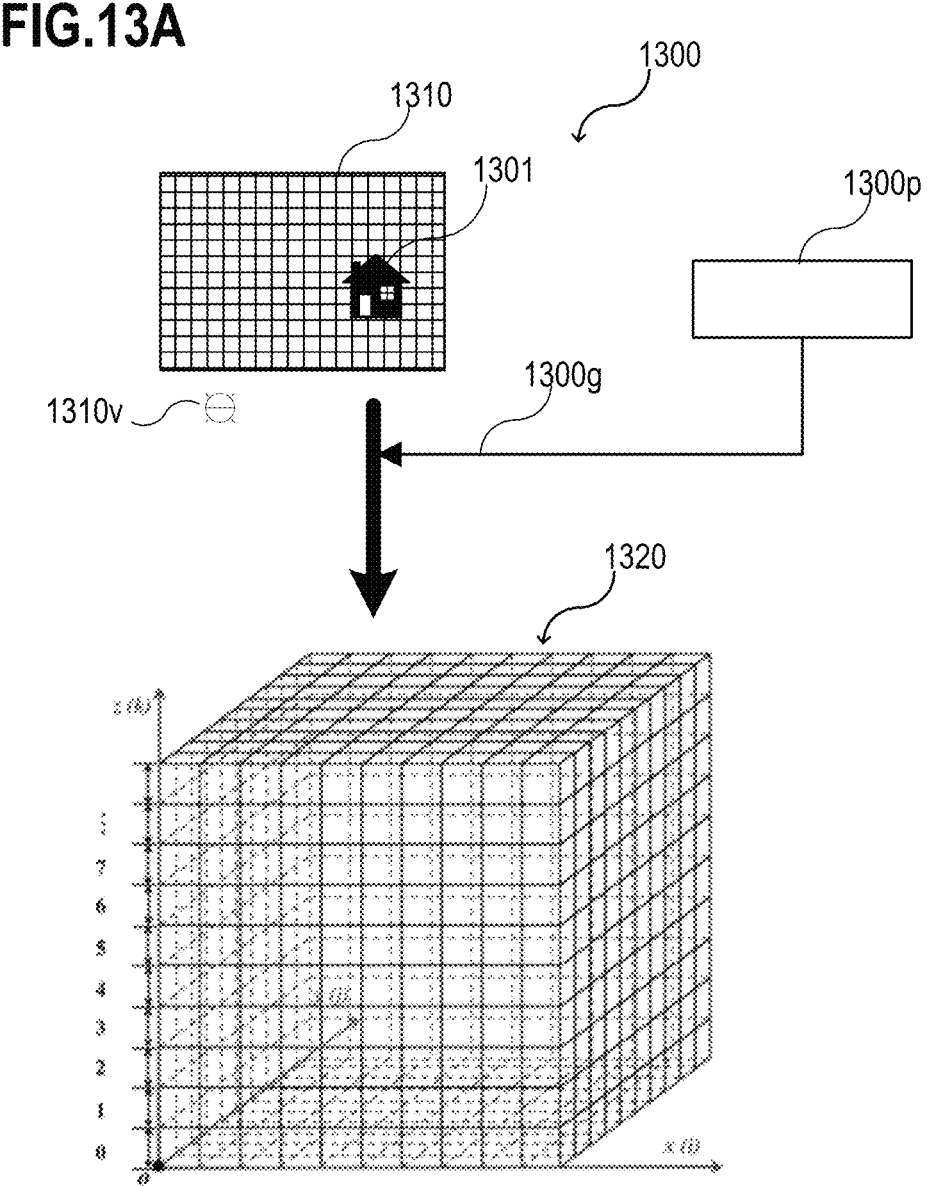

COLLISION AVOIDANCE SYSTEM, DEPTH IMAGING SYSTEM, VEHICLE, MAP GENERATOR AND METHODS THEREOF

TECHNICAL FIELD

Various aspects relate generally to a collision avoidance system, a vehicle, a map generator, a depth imaging system, and methods thereof.

BACKGROUND

An unmanned aerial vehicle (UAV) may have one or more processors to control flight of the unmanned aerial vehicle along a predefined flight path. The one or more processors to control the predefined flight of the unmanned aerial vehicle may be also referred to as a flight controller or may be part of a flight controller. The predefined flight path may be provided and/or modified, for example, by manual remote control, waypoint control, target tracking, etc. Further, an obstacle detection and avoidance system may be implemented to avoid collision of the unmanned aerial vehicle with an obstacle located in the predefined flight path of the unmanned aerial vehicle. As an example, an unmanned aerial vehicle with obstacle detection may be configured to stop in front of a solid object, as for example, a wall, a tree, a pillar, etc., and thus avoid a collision. As an example, the obstacle detection may be based on at least one imaging system and the unmanned aerial vehicle may include one or more processors associated with the at least one imaging system. However, the obstacle detection may be based on other suitable sensor systems as well.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 4 shows various functions of a collision avoidance system, according to various aspects;

FIG. 5 shows various functions of a collision avoidance system, according to various aspects;

FIGS. 13A to 13C show an obstacle map generator in a schematic view and various functions thereof, according to various aspects;

DESCRIPTION

Figure 1:
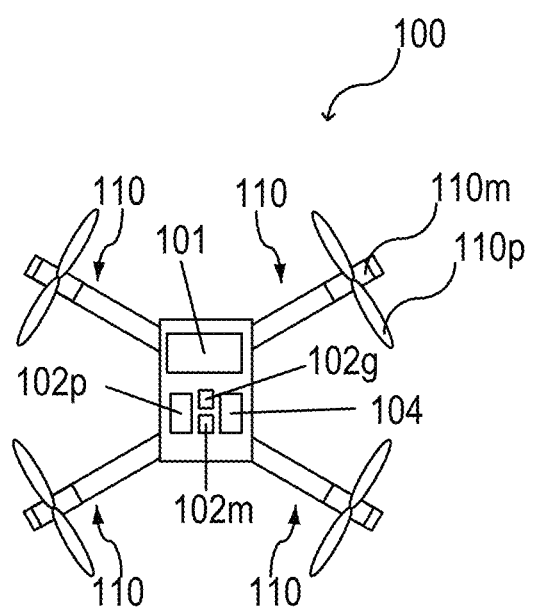
FIG. 1 shows an unmanned aerial vehicle in a schematic view, according to various aspects.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure. The various aspects of the disclosure are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and in the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. Any type of information, as described herein, may be handled for example via a one or more processors in a suitable way, e.g. as data.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a sensor system, a control system, a computing system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like. The term "flight path" used with regard to a "predefined flight path", a "traveled flight path", a "remaining flight path", and the like, may be understood as a trajectory in a two- or three-dimensional space. The flight path may include a series (e.g., a time-resolved series) of positions along which the unmanned aerial vehicle has traveled, a respective current position, and/or at least one target position towards which the unmanned aerial vehicle is traveling. The series of positions along which the unmanned aerial vehicle has traveled may define a traveled flight path. The current position and the at least one target position may define a remaining flight path.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as an unstaffed, uninhabited or unpiloted aerial vehicle, -aircraft or -aircraft system or drone.

The unmanned aerial vehicle, according to various aspects, may include a support frame that serves as a basis for mounting components of the unmanned aerial vehicle, such as, for example, motors, sensors, mechanic, transmitter, receiver, and any type of control to control the functions of the unmanned aerial vehicle as desired. One or more of the components mounted to the support frame may be at least partially surrounded by a shell (also referred to as body, hull, outer skin, etc.). As an example, the shell may mechanically protect the one or more components. Further, the shell may be configured to protect the one or more components from moisture, dust, radiation (e.g. heat radiation), etc.

The unmanned aerial vehicle, according to various aspects, may include a camera gimbal having an independent two- or three-axis degree of freedom to properly track a target, e.g. a person or point of interest, with a tracking camera independently of an actual flight direction or actual attitude of the unmanned aerial vehicle. In some aspects, a depth camera may be used for tracking, monitoring the vicinity, providing images to a user of the unmanned aerial vehicle, etc. A depth camera may allow the association of depth information with an image, e.g., to provide a depth image. This allows, for example, the ability to provide an image of the vicinity of the unmanned aerial vehicle including depth information about one or more objects depicted in the image.

As an example, a depth image may include information to indicate a relative distance of objects displayed in the image. This distance information may be, but is not limited to, colors and/or shading to depict a relative distance from a sensor. Positions of the objects may be determined from the depth information. Based on depth images, a two dimensional map or a three dimensional map may be constructed from the depth information. Said map construction may be achieved using a depth map engine, which may include one or more processors or a non-transitory computer readable medium configured to create a pixel or voxel map (or any other suitable map) from the depth information provided by the depth images. According to various aspects, a depth image may be obtained by a stereo camera, e.g., calculated from two or more images having a different perspective. Further, a depth image may be generated by any suitable one or more sensors (e.g. a laser scanner, etc.) that may allow for a correlation of position information and distance (depth) information.

According to various aspects, a map may be used to store position information and/or the ambient condition information in a suitable form of data that allows controlling one or more operations of the unmanned aerial vehicle based on the map. However, other suitable implementations may be used to allow control of the unmanned aerial vehicle based on at least the movement data.

The unmanned aerial vehicle, according to various aspects, includes at least one sensor for obstacle detection, e.g. only one sensor, two sensors, or more than two sensors. The at least one sensor can be fixedly mounted on the support frame of the unmanned aerial vehicle. Alternatively, the at least one sensor may be fixed to a movable mounting structure so that the at least one sensor may be aligned into a desired direction.

According to various aspects, an unmanned aerial vehicle may have a heading direction. The heading direction may be understood as a reference direction assigned with a straightforward flight direction.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propellers has one or more propeller blades. In some aspects, the propellers may be fixed pitch propellers.

The unmanned aerial vehicle may be configured to operate with various degrees of autonomy: under remote control by a human operator, or fully or intermittently autonomously, by onboard computers. The unmanned aerial vehicle may be configured to lift-off (also referred to as take-off) and land autonomously in a lift-off and/or a landing operation mode. Alternatively, the unmanned aerial vehicle may be controlled manually by a radio control (RC) at lift-off and/or landing. The unmanned aerial vehicle may be configured to fly autonomously based on a flight path. The flight path may be a predefined flight path, for example, from a starting point or a current position of the unmanned aerial vehicle to a target position, or, the flight path may be variable, e.g., following a target that defines a target position. In some aspects, the unmanned aerial vehicle may switch into a GPS-guided autonomous mode at a safe altitude or safe distance. The unmanned aerial vehicle may have one or more fail-safe operation modes, e.g., returning to the starting point, landing immediately, etc. In some aspects, the unmanned aerial vehicle may be controlled manually, e.g., by a remote control during flight, e.g. temporarily.

In the following, an unmanned aerial vehicle is described in more detail. According to various aspects, one or more functions (e.g. one or more collision avoidance functions, one or more safety operations, one or more path finding functions, as examples) of the unmanned aerial vehicle may be controlled based on a two dimensional or three dimensional map.

FIG. 1 illustrates an unmanned aerial vehicle 100 in a schematic view, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110$m$ and at least one propeller 110$p$ coupled to the at least one drive motor 110$m$. According to various aspects, the one or more drive motors 110$m$ of the unmanned aerial vehicle 100 may be electric drive motors. Therefore, each of the vehicle drive arrangements 110 may be also referred to as electric drive or electric vehicle drive arrangement.

Further, the unmanned aerial vehicle 100 may include one or more processors 102$p$ configured to control flight or any other operation of the unmanned aerial vehicle 100. The one or more processors 102$p$ may be part of a flight controller or may implement a flight controller. The one or more processors 102$p$ may be configured, for example, to provide a flight path based at least on a current position of the unmanned aerial vehicle 100 and a target position for the unmanned aerial vehicle 100. In some aspects, the one or more processors 102$p$ may control the unmanned aerial vehicle 100 based on a map, as described in more detail below. In some aspects, the one or more processors 102$p$ may directly control the drive motors 110$m$ of the unmanned aerial vehicle 100, so that in this case no additional motor controller may be used. Alternatively, the one or more processors 102$p$ may control the drive motors 110$m$ of the unmanned aerial vehicle 100 via one or more additional motor controllers. The motor controllers may control a drive power that may be supplied to the respective motor. The one or more processors 102$p$ may include or may implement any type of controller suitable for controlling the desired functions of the unmanned aerial vehicle 100. The one or more processors 102$p$ may be implemented by any kind of one or more logic circuits.

According to various aspects, the unmanned aerial vehicle 100 may include one or more memories 102$m$. The one or more memories 102$m$ may be implemented by any kind of one or more electronic storing entities, e.g. one or more volatile memories and/or one or more non-volatile memories. The one or more memories 102$m$ may be used, e.g., in interaction with the one or more processors 102$p$, to build and/or store the map, according to various aspects.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 101. The one or more sensors 101 may be configured to monitor the vicinity of the unmanned aerial vehicle 100. The one or more sensors 101 may be configured to detect obstacles in the vicinity of the unmanned aerial vehicle 100. According to various aspects, the one or more processors 102$p$ may be further configured to modify a predefined flight path of the unmanned aerial vehicle 100 based on detected obstacles to generate a collision free flight path to the target position avoiding obstacles in the vicinity of the unmanned aerial vehicle. According to various aspects, the one or more processors 102$p$ may be further configured to reduce altitude of the unmanned aerial vehicle 100 to avoid a collision during flight, e.g., to prevent a collision with a flying object that is approaching unmanned aerial vehicle 100 on a collision course. As an example, if the unmanned aerial vehicle 100 and the obstacle may approach each other and the relative bearing remains the same over time, there may be a likelihood of a collision.

The one or more sensors 101 may include, for example, one or more cameras (e.g., a depth camera, a stereo camera, etc.), one or more ultrasonic sensors, one or more radar (radio detection and ranging) sensors, one or more lidar (light detection and ranging) sensors, etc. The one or more sensors 101 may include, for example, any other suitable sensor that allows a detection of an object and the corresponding position of the object. The unmanned aerial vehicle 100 may further include a position detection system 102g. The position detection system 102g may be based, for example, on global positioning system (GPS) or any other available positioning system. Therefore, the one or more processors 102p may be further configured to modify a predefined flight path of the unmanned aerial vehicle 100 based on data obtained from the position detection system 102g. The position detection system 102g may be used, for example, to provide position and/or movement data of the unmanned aerial vehicle 100 itself (including a position, e.g., a direction, a speed, an acceleration, etc., of the unmanned aerial vehicle 100). However, other sensors (e.g., image sensors, a magnetic sensor, etc.) may be used to provide position and/or movement data of the unmanned aerial vehicle 100. The position and/or movement data of both the unmanned aerial vehicle 100 and of the one or more obstacles may be used to predict a collision (e.g., to predict an impact of one or more obstacles with the unmanned aerial vehicle).

According to various aspects, the one or more processors 102p may include (or may be communicatively coupled with) at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102p may further include (or may be communicatively coupled with) an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a velocity (also referred to as flight velocity), a direction (also referred to as flight direction), etc., may be implemented in the one or more processors 102p and/or in additional components coupled to the one or more processors 102p. To receive, for example, position information and/or movement data about one or more obstacles, the input of a depth image camera and image processing may be used. Further, to store the respective information in the (e.g., internal) map of the unmanned aerial vehicle 100, as described herein, at least one computing resource may be used.

The unmanned aerial vehicle 100 may be referred to herein as drone. However, a drone may include other unmanned vehicles, e.g. unmanned ground vehicles, water vehicles, etc. In a similar way, the drone may be any vehicle having one or more autonomous functions that are associated with a control of a movement of the vehicle.

Various aspects are related to an obstacle avoidance system that is configured to allow obstacle avoidance in a GPS-denied environment using depth sensors. In some aspects, the obstacle avoidance system may allow for a minimization of the risk of crashes of an unmanned aerial vehicle or any other drone. In another aspect, the obstacle avoidance system may allow for an efficient inspection of a structure (e.g. of a building, of a machine, etc.). For an inspection, the drone may be set into a distance hold mode, in which the drone keeps a predefined distance away from an object, e.g. from a wall. That way, photos for an inspection may be easily taken from the object.

However, various autonomous operation modes of a drone may require a knowledge of the position of the drone. Usually, the position of the drone is determined based on GPS (Global Positioning System) information, e.g. RTK (Real Time Kinematic) GPS information. However, there may be many areas where an autonomous operation of a drone may be desired (for inspections, rescue operations, etc.) but where the GPS information is either not available or faulty. As an example, various structures (e.g. a bridge, a building, etc.) may shield the GPS signals, so that it may not be possible for a drone to determine its location. As another example, reflections from a water surface may disturb the GPS signals and make a GPS system of a drone at least temporarily useless. Therefore, it may be difficult to inspect an oil platform on the ocean with an autonomously operating drone. As another example, indoor, in tunnels, in a cave, below earth, etc., may be no GPS signals available which usually excludes many inspection cases with obstacle avoidance from customers.

In the following, one or more aspects are described that are related to enabling obstacle avoidance in a GPS-denied environment. The obstacle avoidance may be based on any type of one or more depth image sensors (e.g. a stereo camera, a laser scanner, etc.) without a need for additional sensors. In other words, in some aspects, an obstacle avoidance in GPS-denied environments is based only on input data of one or more depth imaging sensors. This may avoid extra costs and complexity.

In general, SLAM—(Simultaneous Localization and Mapping) may be used for a localization of the drone, however, this method may fail in the case that not enough features are detected. This may happen, for example, in low light conditions or due to moving surfaces like water surfaces. Waves in the ocean, for example, may not allow for a SLAM-localization, which may disturb an oil platform inspection if the inspecting drone would rely on such a type of localization.

Sensors, as for example, ultrasonic sensors, laser scanners, radar sensors, lidar sensors, etc., may be used to some extent, however, they may not provide the detailed view as it can be obtained from one or more depth cameras, as example. Further, laser, lidar and radar may be comparatively heavy and expensive and therefore not optimally suited for drones.

According to various aspects, an added layer of safety is proved to assist pilots in a GPS-restricted environment. The obstacle avoidance system described herein may avoid one or more obstacles within a field of view of one or more depth cameras. This may be a cheap solution in particular when the drone is already equipped with depth sensors. An algorithm is provided to convert depth camera data into a simple and fast accessible data structure that can be used across multiple depth sensors in different directions. Based on this, a real-time force vector is calculated that is used to control the drone. Illustratively, the drones flight controller may be configured to push the drone away from the detected obstacles based on the calculated real-time force vector. This enables an obstacle avoidance on a drone without a need to know the position of the drone (e.g. in GPS-denied environments).

In general, a drone may determine its velocity based on position information. As a result, without position data a drone may not know its current velocity. As there might always be some wind, it may be not beneficial to rely on IMU data only to estimate the current velocity. This causes a general problem for a reliable obstacle avoidance without using positional information.

Figure 2:
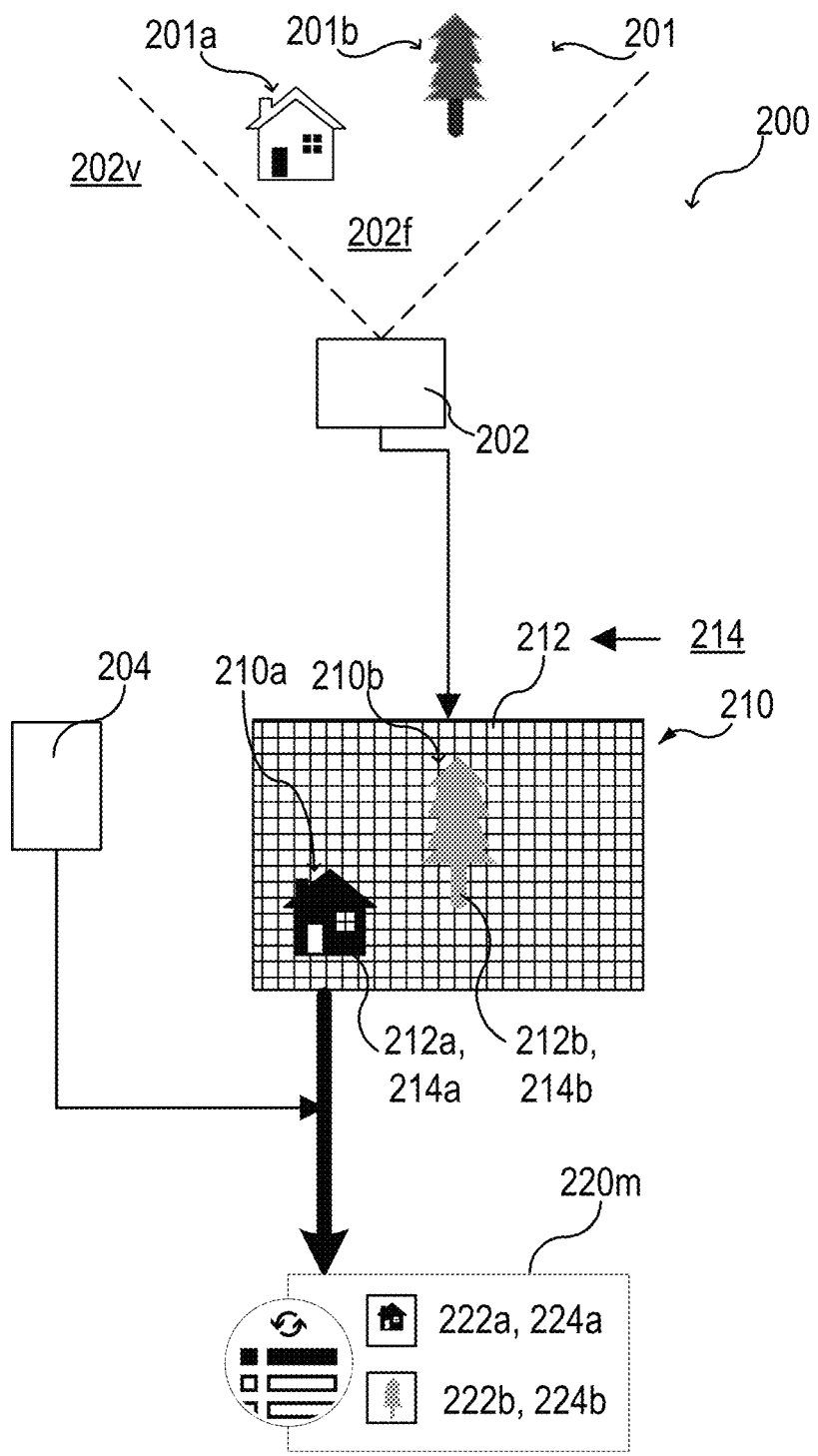
FIG. 2 shows various functions of a collision avoidance system, according to various aspects.

FIG. 2 shows various functions of a collision avoidance system 200, according to various aspects. The collision avoidance system 200 may be implemented in an unmanned aerial vehicle (e.g. in the unmanned aerial vehicle 100 described with reference to FIG. 1) or any other drone. The collision avoidance system 200 may include one or more depth imaging sensors 202, as example. The one or more depth imaging sensors 202 may be configured to provide a depth image 210 of a vicinity 202v of the one or more depth imaging sensors 202. In the case that the one or more depth imaging sensors 202 are part of a drone (e.g. an unmanned aerial vehicle), the one or more depth imaging sensors 202 may provide a depth image 210 of the vicinity 202v of the drone. Each of the one or more depth imaging sensors 202 or a group of the one or more depth imaging sensors 202 may define a respective field of view 202f.

The depth image 210 may include, for example, a plurality of pixels 212. Depth information in the depth image 210 may be represented by a depth value 214 that may be assigned to each pixel of the plurality of pixels 212. The one or more depth imaging sensors 202 may receive obstacle information associated with one or more obstacles 201. As an example, a first obstacle 201a may be closer to the one or more depth imaging sensors 202 than a second obstacle 201b. As a result, in the depth image 210, a first image object 210a that represents the first obstacle 201a may include one or more first pixels 212a having one or more first depth values 214a assigned thereto and a second image object 210b that represents the second obstacle 201b may include one or more second pixels 212b having one or more second depth values 214b assigned thereto, wherein the one or more first depth values 214a are lower than the one or more second depth values 214b.

According to various aspects, the collision avoidance system 200 may include one or more processors 204. Additionally, the collision avoidance system 200 may include one or more memories (not illustrated). In some aspects, a computing system may be used to implement the functions of the collision avoidance system 200. In some aspects, a computing system of a drone may be used to control the drone and to provide the functions of the collision avoidance system 200 as well. However, a dedicated computing system may be used as well to provide the functions of the collision avoidance system 200 for a drone.

According to various aspects, the one or more processors 204 of the collision avoidance system 200 may be configured to determine, from the depth image 210, the one or more image objects 210a, 210b associated with the one or more obstacles 201a, 201b in the vicinity 202v of the one or more depth imaging sensors 202. The image objects representing the one or more obstacles 201 may be identified by an image analysis. As an example, the depth image 210 may be checked for pixel clouds having pixels of similar depth values within a predefined depth value range. According to various aspects, each of the one or more image objects 210a, 210b may include one or more pixels and one or more depth values assigned to the one or more pixels. As an example, the first image object 210a may include one or more first pixels 212a and one or more first depth values 214a assigned to the one or more first pixels 212a; the second image object 210b may include one or more second pixels 212b and one or more second depth values 214b assigned to the one or more second pixels 212b; etc.

According to various aspects, the one or more processors 204 of the collision avoidance system 200 may be configured to determine for each of the one or more image objects 210a, 210b direction information 222a, 222b and distance information 224a, 224b. As an example, the direction information 222a, 222b and distance information 224a, 224b may be stored in a list 220m. As an example, the list may be configured as a map or may be part of a map. In this case, each map position may have a direction associated therewith and a distance value may be assigned to the respective map position.

According to various aspects, the direction information 222a, 222b may represent a direction pointing from the one or more depth imaging sensors 202 to the respective obstacle 201a, 201b that correspond to the respective image object 210a, 210b. The distance information 224a, 224b represents a distance to the respective obstacle along the corresponding direction.

According to various aspects, the direction information 222a, 222b for each obstacle may be stored as a tuple including at least two angles (phi, theta) of a spherical coordinate system. Since the respective direction is determined from the current perspective of the one or more depth imaging sensors 202 (and therefore also from the current perspective of a drone in the case that the collision avoidance system 200 is implemented), a spherical coordinate system may allow an efficient calculation of vectors that can be used to control the drone to avoid collision with the one or more obstacles 201 (see, for example, FIG. 3A to 3D). However, other coordinate systems may be used as well, e.g. a cylindrical or a Cartesian coordinate system.

According to various aspects, the direction information 222a, 222b for each obstacle 201a, 201b may be determined at various times. From the sequence of direction information 222a, 222b, a position, a velocity, and/or other movement parameters may be determined for each obstacle 201a, 201b. As an example, a Kalman filter may be used to estimate the position, velocity, and/or any other movement parameter and/or to predict the movement behavior of the respective obstacle 201a, 201b based on an underlying model to described movement of objects.

Based on the determined/estimated movement parameter, a control vector (also referred to as virtual force vector) may be determined and used to control the drone to avoid collision with the obstacles 201 in the vicinity 202v of the drone.

Figure 3:
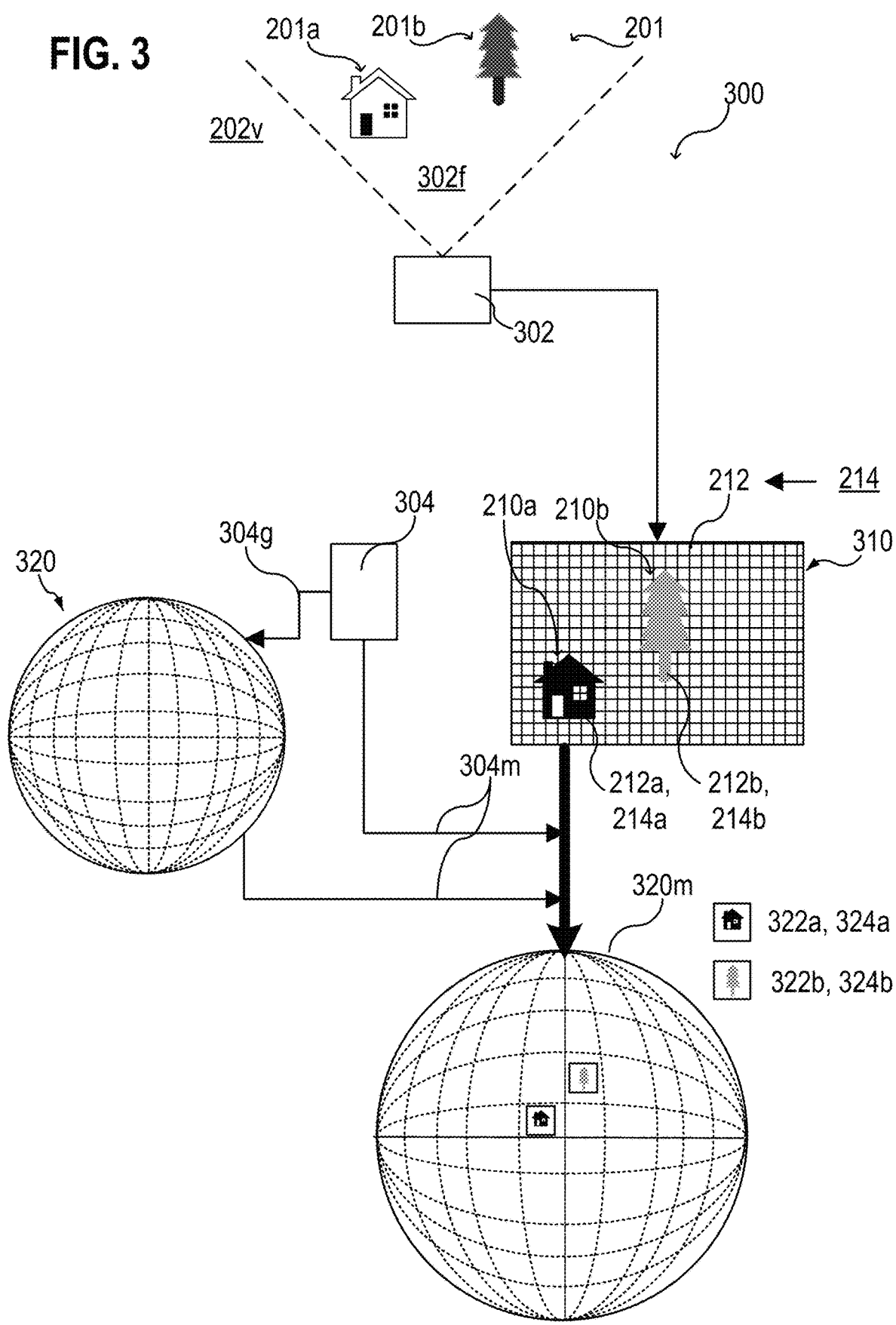
FIG. 3 shows various functions of a collision avoidance system, according to various aspects.

FIG. 3 shows various functions of a collision avoidance system 300, according to various aspects. The collision avoidance system 300 may be implemented in an unmanned aerial vehicle (e.g. in the unmanned aerial vehicle 100 described with reference to FIG. 1) or any other drone. According to various aspects, the collision avoidance system 300 may include one or more depth imaging sensors 302 configured to provide depth images 310 and one or more processors 304 configured to carry out various functions of the collision avoidance system 300. The one or more depth imaging sensors 302 of the collision avoidance system 300 may be configured in the same or in a similar way as described above with reference to the collision avoidance system 200 illustrated, for example, in FIG. 2.

According to various aspects, the one or more processors 304 of the collision avoidance system 300 may be configured to generate 304g a spherical map 320 from the perspective of the one or more depth imaging sensors 302, e.g., when mounted at a drone from the perspective of the drone. The spherical map 320 may be generated with a predefined resolution. As an example, the spherical map 320 may be generated in accordance with at least two resolution parameters. In spherical coordinates, the pair of angles (phi, theta) may be used to describe a direction that may point to any desired position of the coordinate system. The distance (usually denoted in spherical coordinates as the radius "r") may be used in addition to the pair of angles to unambiguously define a position in the coordinate system.

The spherical map 320 may have a reference plane and a reference direction in the reference plane. The reference plane may be a horizontal plane the reference direction may be the heading direction of the drone and/or a line of sight defined by the one or more depth imaging sensors 302. The origin of the spherical coordinate system may be associated with the one or more depth imaging sensors 302, e.g., when mounted at a drone with the drone. Illustratively, the drone may be associated with an observer. A vector from the observer (e.g. the origin of the spherical coordinate system) to a point of interest (e.g. to a position of an obstacle 201) may be projected perpendicularly onto the reference plane, wherein the respective angle between the projected vector and the reference vector in the reference plane is referred to as azimuth. The angle between the point of interest and the reference plane may be referred to as altitude angle or elevation. The elevation may be in the range from −90° (degrees) to +90° from the perspective of a flying drone, e.g. in the range from about −85° to about +85°. The azimuth may be between −180° and 180°. According to various aspects, the spherical map 320 may fully cover the space around the drone (e.g. with 180° elevation and 360° azimuth) or at least partially (e.g. with 170° elevation, e.g. from −85° to 85°) and with 360° (full) azimuth.

The resolution of the spherical map 320 may be defined by the two angular resolution parameters, e.g. denoted as Δphi, Δtheta. As an example, the angular resolution parameters Δphi may be associated with the azimuth and in the range from about 0.5° to about 5°. That may result, for example, from 720 to only 72 entries (depending on the resolution) for the map to cover the full azimuth (i.e. 360°) of the spherical map 320. The angular resolution parameters Δtheta may be associated with the elevation and in the range from about 1° to about 10°. That may result, for example, from 180 to 18 entries (depending on the resolution) for the map to cover the full elevation (i.e. 180°) of the spherical map 320.

It has to be understood that the spherical map, since it has a limited resolution, is more or less an approximation of an ideal sphere. In some aspects, a suitable resolution and therefore a suitable approximation of the sphere in the spherical map may be used. Illustratively, the spherical map has a predefined granularity that is referred to as resolution.

According to various aspects, the one or more processors 304 may be further configured to map 304m the depth image 310 to the generated spherical map 320. The resulting spherical map 320m may include a set of directions 322a, 322b and a depth value 324a, 324b assigned to each direction of the set of directions 322a, 322b. The determination (and e.g. storage) of depth values 324a, 324b assigned to the respective directions 322a, 322b may be similar to generation (and e.g. storage) of the list 220m that is used in the collision avoidance system 200 described with reference to FIG. 2.

According to various aspects, the mapping of the depth image 310 may result on a partially filled resulting map 320m. Illustratively, the respective field of view 302f of the one or more depth imaging sensors 302 may define the regions of the resulting map 320m that are filled with depth values 324a, 324b from the depth image 310. According to various aspects, the plurality of depth imaging sensors 302 may be used having distinct line of sights and therefore provide depth information from distinct fields of view that may be mapped to the spherical map 320.

FIG. 4 shows various functions of a collision avoidance system 400, according to various aspects. The collision avoidance system 400 may be implemented in an unmanned aerial vehicle (e.g. in the unmanned aerial vehicle 100 described with reference to FIG. 1) or any other drone. The collision avoidance system 400 may include one or more processors 404 configured to carry out various functions of the collision avoidance system 400. The one or more processors 404 of the collision avoidance system 400 may be further configured to determine 404d, from a spherical map 420m including a set of directions 422a, 422b and a depth value 424a, 424b assigned to each direction of the set of directions 422a, 422b, a first obstacle 401a located within a first distance range 414a and first movement information 432a associated with the first obstacle 401a. The one or more processors 404 of the collision avoidance system 400 may be further configured to determine, from the spherical map 420m, a second obstacle 401b located within a second distance range 414b and second movement information 432b associated with the second obstacle 401b. The second distance range 414b is distinct from (e.g. greater than) the first distance range 414a.

According to various aspects, the first distance range 414a may define a first search volume (V1) for identifying obstacles near a drone 100 including the collision avoidance system 400. The second distance range 414b may define a second search volume (V2) for identifying obstacles that are farther away from the drone 100 than obstacles in the first search volume (V1). In some aspects, the first search volume (V1) may have the shape of at least a portion of a sphere of with a first radius R1 and the second search volume (V2) may have the shape of at least a portion of a hollow sphere with the first radius R1 as an inner radius and a second radius R2 as an outer radius. In this case, the first radius R1 may define the first distance range 414a and both, the first and second radius R1, R2 may define the second distance range 414b.

According to various aspects, the drone 100 may be any suitable vehicle that may have access to a spherical map 420, the resulting map 320m as described with reference to the collision avoidance system 300 illustrated in FIG. 3 may be used as the spherical map 420. Illustratively, the functions of the collision avoidance system 400 may be carried out in the same or in a similar way by the one or more processors 304 of the collision avoidance system 300. In a similar way, the list 220m as described with reference to the collision avoidance system 200 described with reference to FIG. 2 may be used in a similar way to determine obstacles and movement information associated therewith.

FIG. 5 shows various functions of a collision avoidance system, e.g. of the collision avoidance system 400, according to various aspects. As an example, the one or more processors 404 of the collision avoidance system 400 may be further configured to determine a virtual force vector 502 based on the determined movement information 432a, 432b.

The virtual force vector 502 may illustratively face away from the one or more determined obstacles 401a, 401b to avoid a collision of the drone therewith.

Figure 6:
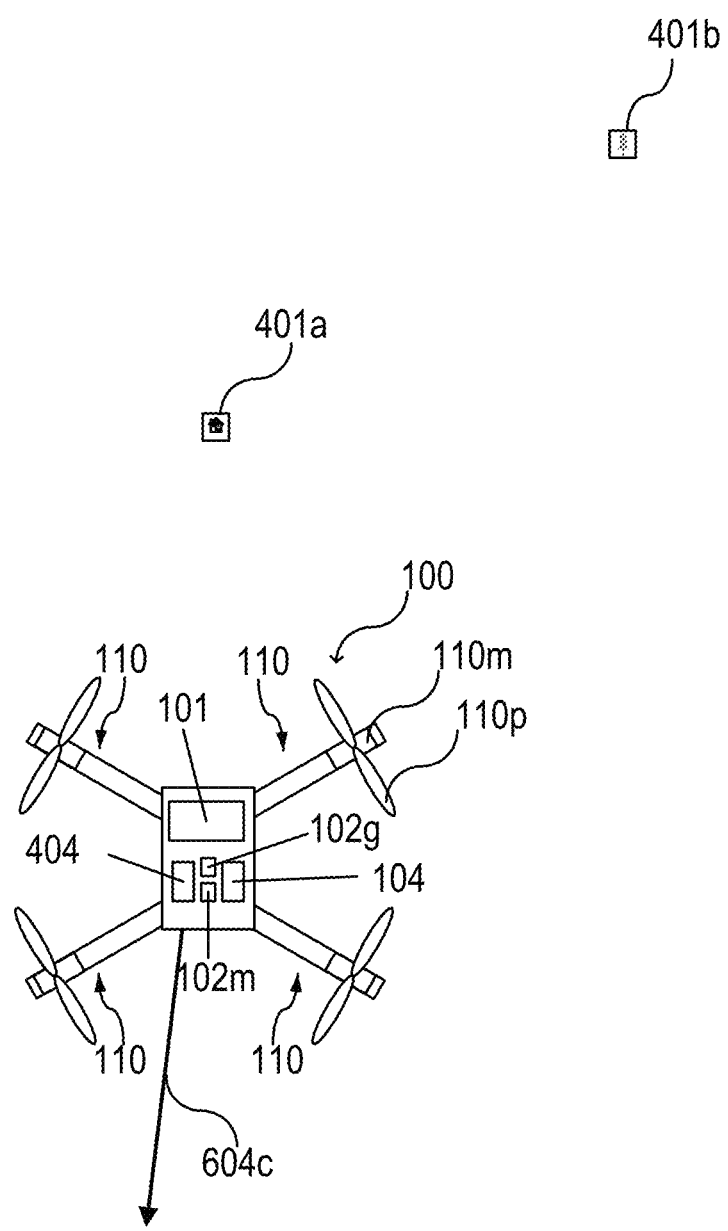
FIG. 6 shows various functions of a collision avoidance system of an unmanned aerial vehicle, according to various aspects.

FIG. 6 shows various functions of a collision avoidance system of an unmanned aerial vehicle 100 or any other drone, e.g. of the collision avoidance system 400 that may be implemented in the unmanned aerial vehicle 100, according to various aspects. As an example, the one or more processors 404 of the collision avoidance system 400 may be further configured to control 604c flight of the unmanned aerial vehicle 100 based on the virtual force vector 502 to avoid, for example, a collision of the unmanned aerial vehicle 100 with the first obstacle 401a and the second obstacle 401b.

According to various aspects, the one or more processors 404 directly or indirectly control the drive motors 110m of the unmanned aerial vehicle 100 (or any other drive system of a drone) in accordance with the determined virtual force vector 502 to generate an actual propulsion (in other words a real force vector) that pushes the unmanned aerial vehicle 100 away from the one or more obstacles 401a, 401b.

According to various aspects, the one or more processors 204, 304, 404 may be respectively part of the unmanned aerial vehicle 100 or the functions provided by the one or more processors 204, 304, 404 may be implemented by the one or more processors 102p of the unmanned aerial vehicle 100.

Figure 7:
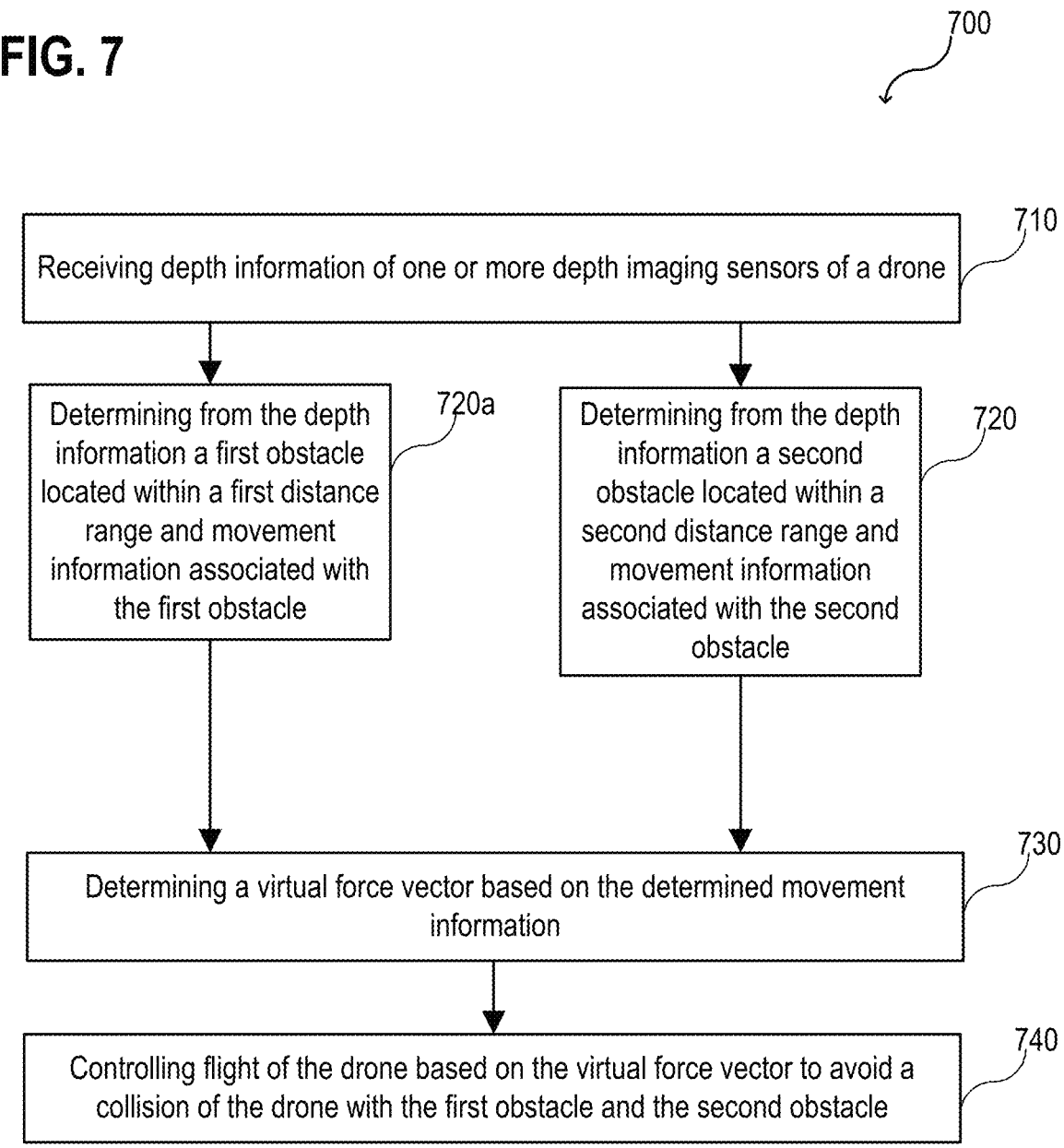
FIG. 7 shows a schematic flow diagram of a collision avoidance method, according to various aspects.

FIG. 7 shows a schematic flow diagram of a method 700 for collision avoidance, according to various aspects. The method 700 may include: in 710, receiving depth information of one or more depth imaging sensors of a drone; in 720a, determining from the depth information a first obstacle located within a first distance range and movement information associated with the first obstacle; in 720b, determining from the depth information a second obstacle located within a second distance range and movement information associated with the second obstacle (the second distance range is distinct from the first distance range); in 730, determining a virtual force vector based on the determined movement information; and, in 740, controlling (e.g. directly or indirectly) flight of the drone based on the virtual force vector to avoid a collision of the drone with the first obstacle and the second obstacle.

Figure 8:
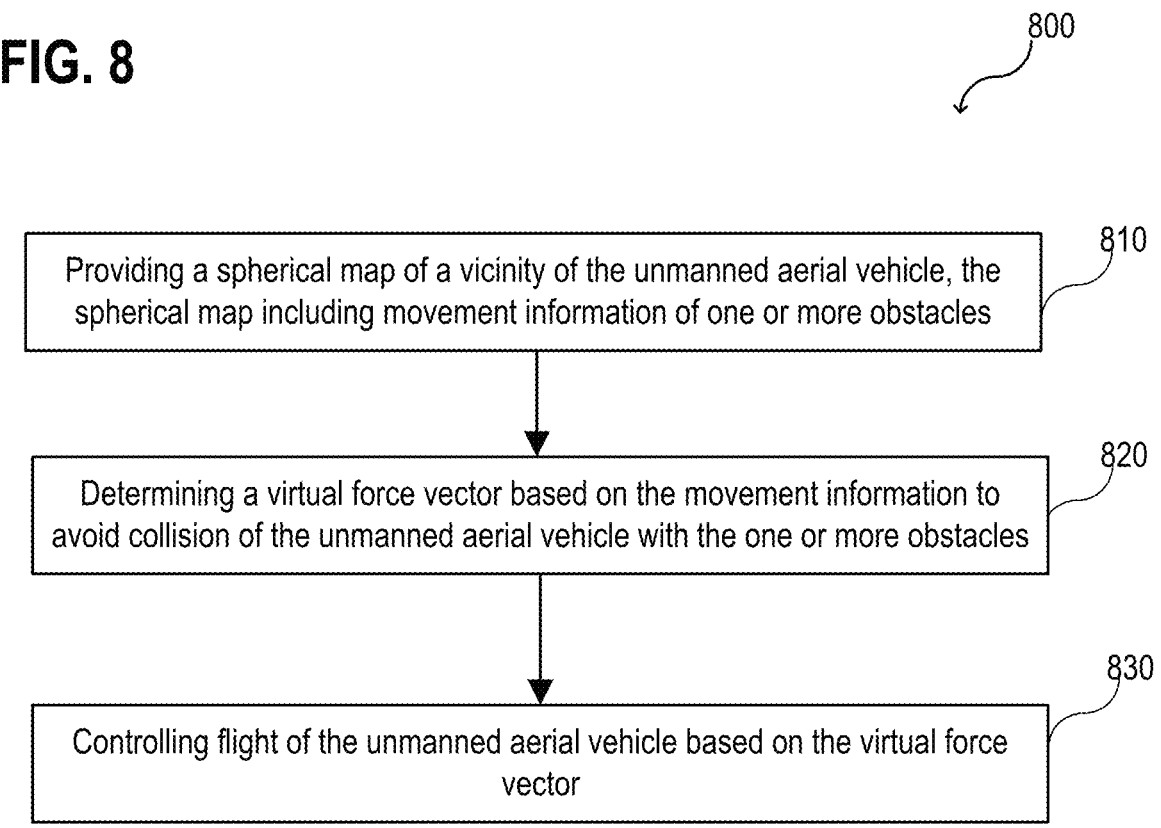
FIG. 8 shows a schematic flow diagram of a method for operating an unmanned aerial vehicle, according to various aspects.

FIG. 8 shows a schematic flow diagram of a method 800 for operating an unmanned aerial vehicle (e.g. the unmanned aerial vehicle 100 as illustrated in FIG. 1 or any other drone), according to various aspects. The method 800 may include: in 810, providing a spherical map of a vicinity of the unmanned aerial vehicle, the spherical map including movement information of one or more obstacles; in 820, determining a virtual force vector based on the movement information to avoid a collision of the unmanned aerial vehicle with the one or more obstacles; and, in 830, controlling (e.g. directly or indirectly) flight of the unmanned aerial vehicle based on the virtual force vector.

Figure 9:
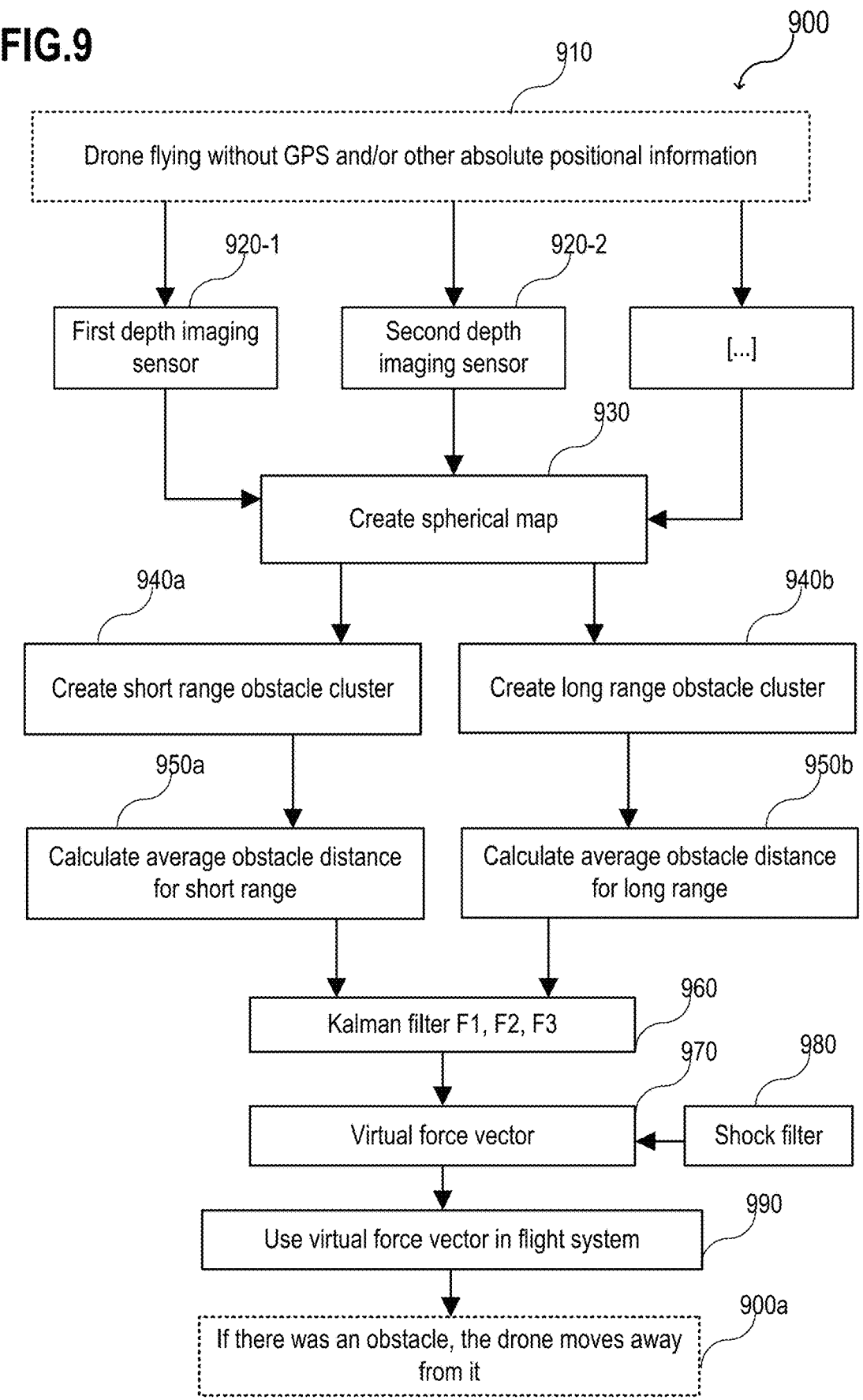
FIG. 9 shows a schematic flow diagram of a collision avoidance function of a drone, according to various aspects.

FIG. 9 shows a schematic flow diagram 900 of a collision avoidance function 900a of a drone, according to various aspects. In some aspects, one or more functions described in the schematic flow diagram 900 may be implemented in the unmanned aerial vehicle 100 described with reference to FIG. 1 or in any other suitable drone. Further, one or more aspects of the collision avoidance function 900a may be implemented in the collision avoidance system 200, 300, 400 or in any suitable system.

In some aspects, the drone may fly (e.g. at least temporarily) without GPS and/or other absolute positional information, as shown in 910. As an example, no GPS information and/or other absolute positional information may be received by the drone due to conditions of the surrounding of the drone, e.g. the GPS signals may be shielded by one or more objects in the surrounding of the drone. However, even in the case that GPS information and/or other absolute positional information is received by the drone, this information may not be used to control flight of the drone since they may be prone to errors at least in some cases.

According to various aspects, a depth image may be received from at least one depth camera 920-1, 920-2, etc. The system provided herein may allow easy implementation of any desired number of depth cameras and the system may be unchanged if one or more of the depth cameras are added to or removed from the system.

The depth image may be generated via any suitable depth imaging system, e.g. via a regular stereo camera. The depth image may be for example in the format of 640×360 depth pixel. Each depth pixel may describes a depth value as an unsigned 16-bit value, e.g. a depth value of 4000 may represent a depth at four meters from the camera. Other representations may be possible as well, e.g. float values, as example.

The depth image may be considered as a depth map since it maps depth values to pixels and the pixels may represent positions in real space. According to various aspects, a spherical map is created, in 930, from the respective one or more depth images provided by the one or more depth cameras 920-1, 920-2 (or, in other words, a spherical map is created from the original depth map). The spherical map may be an approximation of spherical distances around the drone within certain angles. According to various aspects, the spherical map may have a lower resolution than the depth images (or, in other words, that the original depth map). This may allow fast calculations based on information obtained from the spherical map. According to various aspects, only the depth values within a relevant range may be considered. The relevant range may depend from the movement capabilities of the drone, e.g. only depth values relevant for a drone that may be able to move with a velocity of about 5 m/s to 10 about 10 m/s may be considered. An example, the spherical map may have the following properties: 150 entries to cover the full azimuth of the spherical approximation and 50 entries to cover most of the elevation (e.g. from −85 to 85 degrees). The values on the poles may be a special cases and therefore not used and not required in the algorithm described herein. The valid depth range for considering obstacles may be, for example, from zero meters to about twelve meters. However, other depth ranges may be used in the same or a similar way.

According to various aspects, the spherical map may be filled with data (depth information) from the one or more depth images received from the one or more depth cameras 920-1, 920-2. For performance reasons, the depth image may be filtered down. As an example, 4×4 blocks of depth values are combined to a new (downscaled) depth value. For every depth pixel, its location may be projected into the space of the spherical map. If the projection is inside the spherical map, the corresponding value is assigned to it. If there was already a value set, the minimum of both values is maintained. The spherical map may be filled from information provided by multiple depth images, for example when multiple cameras are disposed on the drone.

Based on the generated spherical map, a volume of the closest obstacle cluster may be determined. This may include defining one or more regions of interest. This allows skipping some values in the spherical map that might be useful in special cases. For example, no full obstacle avoidance may be desired, e.g. towards the ground, in the case that the drone is controlled to land on the ground. In such a case, a region of interest may be set within −60 to 85 degrees for the elevation.

According to various aspects, two distances for obstacles close to the drone may be determined, in 940a, 940b, 950a, 950b. Therefore, a first volume (see, for example, volume V1 in FIG. 4) may be associated with a short-range and a second volume V2 may be associated with a long-range (see, for example, volume V2 in FIG. 4). Obstacles farther away than the long rang may not be considered. In each iteration, the closest value from the spherical map is determined up to a maximum distance (DistMaxV1, DistMaxV1). For the short-range (V1), the maximum distance value maybe set by the user to keep off obstacles, e.g. to a maximum distance of 5 meters. For the long-range (V2), the maximum distance value maybe set to about 12 meters.

In some aspects, one outcome of the determination may be that there is no obstacle in the first volume (V1), e.g. no obstacle in a first distance range between 0 and 5 meters. However, the closest obstacle may be determined in the second volume (V2), e.g. at 7 meters. Another outcome may be that within the first volume (V1) the closest obstacle is at 4 meters; and, within the second volume (V2) one or more obstacles may be determined at distances beyond 5 meters, which are not tracked by the first volume V1.

Based on the ranges, an obstacle cluster given from the closest match up to a certain threshold added to it, e.g. +2 meters. Now an average distance value of the respective obstacle cluster is calculated for the first volume (V1) and the second volume (V2). The result may be referred to herein as first average (A1) and second average (A2).

In some aspects, a smooth mathematical handling of the values may be provided via handling the values within a Kalman filter. The average distance values (A1, A2) may be inverted within a range from 0 to 12 meters. For example, an average distance value of 2 meters would be stored with the value 10 (based on the calculation 12 minus 2). In the special case that no obstacles are determined within one or both of the volumes (V1 and/or V2), and, therefore, no valid distance values are determined, the inverted distance value may be set to 0.

According to various aspects, the inverted average distance (InvA1, InvA2) of the respective volume (V1, V2) may be determined from the average distance values (A1, A2) and the maximal distance (DistMaxV1, DistMaxV2) of the respective volume based one the following equations:

$$InvA1 = DistMaxV1 - A1; \qquad (I)$$

and $$InvA2 = DistMaxV2 - A2 \qquad (II)$$

To make use of the two average distance values from the respective volumes (V1, V2), three instances of a tracking filter (e.g. a Kalman filter with constant velocity model) may be used, in 960. According to various aspects, a first filter F1 may include a three dimensional tracking filter with InvA1 as input. The output of the first filter F1 may be a smoothed estimated 3D position and 3D velocity for the first volume (V1). According to various aspects, a second filter F2 may include a three dimensional tracking filter with InvA2 as input. The output of the second filter F2 may be a smoothed estimated 3D position and 3D velocity for the second volume (V2). According to various aspects, a third filter F3 may include a one-dimensional tracking filter with length (norm) of InvA2 as input. The Output of the third filter F3 may be a smoothed estimated distance to the obstacle (1D) and velocity (1D).

According to various aspects, a virtual force vector may be determined from the output of the filters F1, F2, F3, in 970. The virtual force vector may illustratively push the drone away from the determined obstacles. The velocity of the third filter F3 and direction of the second filter F2 may be used to slow down the drone when approaching an obstacle in the second volume. The position and the velocity of the first filter F1 may be used to push the drone away from the obstacle in the first volume. As an example, this value of the first filter (F1) may be multiplied with a manually tuned value, (e.g. 1.5) to, for example, enforce a faster push back from obstacles near the drone. The velocity of the first filter F1 may be used to stop the drone after the push back.

In some aspects, an overly hasty reaction from the drone may be avoided when a new obstacle is suddenly detected, e.g. when the drone is rotated and due to the rotation a close object is suddenly visible from the depth cameras. Therefore, according to various aspects, a shock filter may be implemented. As an example, previous position outputs of the first filter F1 may be stored and, if the difference between a new position output of the first filter F1 and the previously stored value is too high, the shock filter is applied, in 980. The shock filter may be implemented as a scaling factor for the virtual force vector. When an obstacle suddenly appears, the scaling factor is, for example, set to 0. Therefore, the applied final force may be zero. The scaling factor is increased over time until it reaches 1 and has no effect anymore.

According to various aspects, once the virtual force vector has been determined (e.g. calculated), the flight system may control flight of the drone based on the virtual force vector, in 990. As an example, a flight controller (see FIG. 6) will adapt the speed of the motors, which will lead to the evasion of the obstacle, and therefore to an obstacle avoidance, see 900*a*.

In the following, various examples are described that may refer to one or more aspects described herein, e.g. to the collision avoidance functions and or the drone including one or more of the collision avoidance functions that are described with reference to FIGS. 1 to 9.

Example 1 is a collision avoidance system, including: one or more depth imaging sensors configured to provide a depth image of a vicinity of the one or more depth imaging sensors, the depth image including a plurality of pixels, wherein a depth value is assigned to each pixel of the plurality of pixels; and one or more processors configured to determine, from the depth image, one or more image objects associated with one or more obstacles in the vicinity of the one or more depth imaging sensors, each of the one or more image objects including one or more pixels and one or more depth values assigned to the one or more pixels, determine for each of the one or more image objects direction information and distance information, wherein the direction information represents a direction pointing from the one or more depth imaging sensors to the obstacle that correspond to the respective image object and wherein the distance information represents a distance to the obstacle along the direction.

In example 2, the collision avoidance system of example 1 may optionally further include that the one or more processors are configured to determine the respective direction based on a position of the respective pixel in the depth images.

In example 3, the collision avoidance system of example 1 or 2 may optionally further include that the one or more processors are configured to determine the respective direction by mapping the depth image in accordance with a field of view of the one or more image sensors to a two-dimensional map.

In example 4, the collision avoidance system of example 3 may optionally further include that the two-dimensional map is a spherical map.

In example 5, the collision avoidance system of example 1 may optionally further include that the spherical map is generated in accordance with two resolution parameters and wherein the directions are defined by two coordinates.

Example 6 is an unmanned aerial vehicle, including: one or more depth imaging sensors configured to provide a depth image of the vicinity of the unmanned aerial vehicle; and one or more processors configured to generate a spherical map from the perspective of the unmanned aerial vehicle, map the depth image to the spherical map, the spherical map includes a set of directions and a depth value assigned to each direction of the set of directions, determine from the spherical map a first obstacle located within a first distance range and movement information associated with the first obstacle, determine from the spherical map a second obstacle located within a second distance range and movement information associated with the second obstacle, the second distance range is distinct from the first distance range, determine a virtual force vector based on the determined movement information, and control flight of the unmanned aerial vehicle based on the virtual force vector to avoid a collision of the unmanned aerial vehicle with the first obstacle and the second obstacle.

In example 7, the unmanned aerial vehicle of example 6 may optionally further include that the determination of the first obstacle includes detecting a plurality of obstacles within the first distance range and determining an obstacle with the lowest distance to the unmanned aerial vehicle, the determined obstacle within the first distance range having the lowest distance to the unmanned aerial vehicle is the first obstacle.

In example 8, the unmanned aerial vehicle of example 6 or 7 may optionally further include that the determination of the second obstacle includes detecting a plurality of obstacles within the second distance range and determining an obstacle with the lowest distance to the unmanned aerial vehicle, the determined obstacle within the second distance range having the lowest distance to the unmanned aerial vehicle is the second obstacle.

In example 9, the unmanned aerial vehicle of any one of examples 6 to 8 may optionally further include that the control of the flight of the unmanned aerial vehicle includes controlling the unmanned aerial vehicle to increase distance to at least one of the first obstacle or the second obstacle.

In example 10, the unmanned aerial vehicle of any one of examples 6 to 9 may optionally further include that the control of the flight of the unmanned aerial vehicle includes controlling the unmanned aerial vehicle to generate a propulsion based on the virtual force vector.

In example 11, the unmanned aerial vehicle of any one of examples 6 to 10 may optionally further include that the one or more processors are configured to deactivate the determination of the second obstacle within the second distance range and determine the virtual force vector only based on the movement information associated with the first obstacle.

In example 12, the unmanned aerial vehicle of any one of examples 6 to 11 may optionally further include that a maximal distance of the first distance range is smaller than a minimal distance of the second distance range.

In example 13, the unmanned aerial vehicle of any one of examples 6 to 12 may optionally further include that the respective movement information includes a relative position of the respective obstacle.

In example 14, the unmanned aerial vehicle of example 13 may optionally further include that one or more processors are configured to perform the determination of the respective movement information at predefined time intervals and limit a change of the relative position over time to a maximal rate.

In example 15, the unmanned aerial vehicle of any one of examples 6 to 14 may optionally further include that the respective movement information includes a relative velocity of the respective obstacle, and/or a parameter representing whether the respective obstacle approaches the unmanned aerial vehicle or not.

In example 16, the unmanned aerial vehicle of any one of examples 6 to 15 may optionally further include that the respective movement information is determine via a tracking filter.

In example 17, the unmanned aerial vehicle of any one of examples 6 to 16 may optionally further include that the tracking filter is a Kalman filter. In some aspects, the Kalman filter may include a predefined movement model to predict movement of the respective obstacle.

Example 18 is a vehicle including: at least one partially or completely autonomous driving function; and the collision avoidance system of any one of examples 1 to 5 configured to activate or modify the at least one partially or completely autonomous driving function. According to various aspects, the at least one partially or completely autonomous driving function may include an emergency brake function, an autopilot function, an obstacle evasion maneuver function, as examples.

Example 19 is a collision avoidance method, including: receiving depth information of one or more depth imaging sensors of an unmanned aerial vehicle; determining from the depth information a first obstacle located within a first distance range and movement information associated with the first obstacle; determining from the depth information a second obstacle located within a second distance range and movement information associated with the second obstacle, the second distance range is distinct from the first distance range, determining a virtual force vector based on the determined movement information, and controlling flight of the unmanned aerial vehicle based on the virtual force vector to avoid a collision of the unmanned aerial vehicle with the first obstacle and the second obstacle.

Example 20 is a collision avoidance method, including: receiving depth information of one or more depth imaging sensors of a vehicle; determining from the depth information a first obstacle located within a first distance range and movement information associated with the first obstacle; determining from the depth information a second obstacle located within a second distance range and movement information associated with the second obstacle, the second distance range is distinct from the first distance range, determining a virtual force vector based on the determined movement information, and controlling movement of the vehicle based on the virtual force vector to avoid a collision of the vehicle with the first obstacle and the second obstacle.

In example 21, the method of example 19 or 20 may optionally further include that the determination of the first obstacle includes detecting a plurality of obstacles within the first distance range and determining an obstacle with the lowest distance to the unmanned aerial vehicle, the determined obstacle within the first distance range having the lowest distance to the unmanned aerial vehicle is the first obstacle.

In example 22, the method of any one of examples 19 to 21 may optionally further include that the determination of the second obstacle includes detecting a plurality of obstacles within the second distance range and determining an obstacle with the lowest distance to the unmanned aerial vehicle, the determined obstacle within the second distance range having the lowest distance to the unmanned aerial vehicle is the second obstacle.

In example 23, the method of any one of examples 19 to 22 may optionally further include: deactivating the determination of the second obstacle within the second distance range and determining the virtual force vector only based on the movement information associated with the first obstacle.

In example 24, the method of any one of examples 19 to 23 may optionally further include that a maximal distance of the first distance range is smaller than a minimal distance of the second distance range.

In example 25, the method of any one of examples 19 to 24 may optionally further include that the respective movement information is determined at predefined time intervals and that a change of the relative position over time is limited to a maximal rate.

Example 26 is a method for operating an unmanned aerial vehicle, the method including: providing a spherical map of the vicinity of the unmanned aerial vehicle, the spherical map including movement information of one or more obstacles, determining a virtual force vector based on the movement information to avoid collision with the one or more obstacles, control flight of the unmanned aerial vehicle based on the virtual force vector.

In example 27, the method of example 26 may optionally further include that providing the spherical map includes: providing a depth image of the vicinity of the unmanned aerial vehicle, the depth image including a plurality of pixels, wherein a depth value is assigned to each pixel of the plurality of pixels; and determining for each of the plurality of pixels a direction and a depth value corresponding to the direction, wherein the depth value represents a distance to the respective obstacle along the direction.

In example 28, the method of example 26 or 27 may optionally further include that the movement information of the spherical map are updated consecutively at predefined time intervals.

In example 29, the method of any one of examples 26 to 28 may optionally further include that the control of the flight of the unmanned aerial vehicle includes controlling the unmanned aerial vehicle to increase distance to at least one of the first obstacle or the second obstacle.

In example 30, the method of any one of examples 26 to 29 may optionally further include that the control of the flight of the unmanned aerial vehicle includes controlling the unmanned aerial vehicle to generate a propulsion based on the virtual force vector.

Example 31 is a collision avoidance system, including: one or more depth imaging sensors configured to provide a depth image of a vicinity of a vehicle; and one or more processors configured to generate a spherical map from the perspective of the vehicle, map the depth image to the spherical map, the spherical map includes a set of directions and a depth value assigned to each direction of the set of directions, determine from the spherical map a first obstacle located within a first distance range and movement information associated with the first obstacle, determine from the spherical map a second obstacle located within a second distance range and movement information associated with the second obstacle, the second distance range is distinct from the first distance range, determine a virtual force vector based on the determined movement information. The vehicle may be an unmanned aerial vehicle.

In example 32, the collision avoidance system of example 31 may optionally further include that the determination of the first obstacle includes detecting a plurality of obstacles within the first distance range and determining an obstacle with the lowest distance to the vehicle, the determined obstacle within the first distance range having the lowest distance to the vehicle is the first obstacle.

In example 33, the collision avoidance system of example 31 or 32 may optionally further include that the determination of the second obstacle includes detecting a plurality of obstacles within the second distance range and determining an obstacle with the lowest distance to the vehicle, the determined obstacle within the second distance range having the lowest distance to the vehicle is the second obstacle.

In example 34, the collision avoidance system of any one of examples 31 to 33 may optionally further include that the one or more processors are further configured to deactivate the determination of the second obstacle within the second distance range and determine the virtual force vector only based on the movement information associated with the first obstacle.

In example 35, the collision avoidance system of any one of examples 31 to 34 may optionally further include that a maximal distance of the first distance range is smaller than a minimal distance of the second distance range.

In example 36, the collision avoidance system of any one of examples 31 to 35 may optionally further include that the respective movement information includes a relative position of the respective obstacle.

In example 37, the collision avoidance system of any one of examples 31 to 36 may optionally further include that one or more processors are configured to perform the determination of the respective movement information at predefined time intervals and limit a change of the relative position over time to a maximal rate.

In example 38, the collision avoidance system of any one of examples 31 to 37 may optionally further include that the respective movement information includes a relative velocity of the respective obstacle.

In example 39, the collision avoidance system of any one of examples 31 to 38 may optionally further include that the respective movement information is determine via a tracking filter.

In example 40, the collision avoidance system of example 39 may optionally further include that the tracking filter is a Kalman filter. In some aspects, the Kalman filter may include a predefined movement model to predict movement of the respective obstacle.

In general, a drone or any other vehicle may include an obstacle avoidance function. Various sensors or sensor systems may be used to detect one or more obstacles in a vicinity of the drone, as an example, one or more depth sensors (e.g. one or more depth cameras) may be used to receive information about the vicinity of the drone. In some setups, a drone may include more than one depth sensor (e.g. two depth sensors) covering about 90 degrees to the front and about 90 degrees to one side of the drone. In various setups, a real-time snapshot of a camera system may only partially cover the vicinity of the drone or any other vehicle. Therefore, the received depth images may be stored within in a voxel map to improve collision detection and therefore to improve collision avoidance. Various methods may be used to do store the information of the depth images in a (e.g. three-dimensional) voxel map. As an example, an open source library may be used to store 3D data in the shape of a voxel grid.

According to various aspects, an algorithm is provided that includes a probability model, which may be applied during the generation of the voxel map. The algorithm may be based on ray tracing (also referred to as ray casting). Illustratively, ray tracing may be used to identify voxels in the voxel map representing free space between the drone and one or more obstacle detected via the depth sensors. That way, a more robust map may be created which can handle outliers much better.

According to various aspects, a method for mapping obstacle data into a voxel map is provided wherein the mapping includes a ray tracing algorithm. For every input, a certain probability for occupied or free space may be calculated. This may enable a much more robust mapping for drones and any other vehicle.

Figure 10:
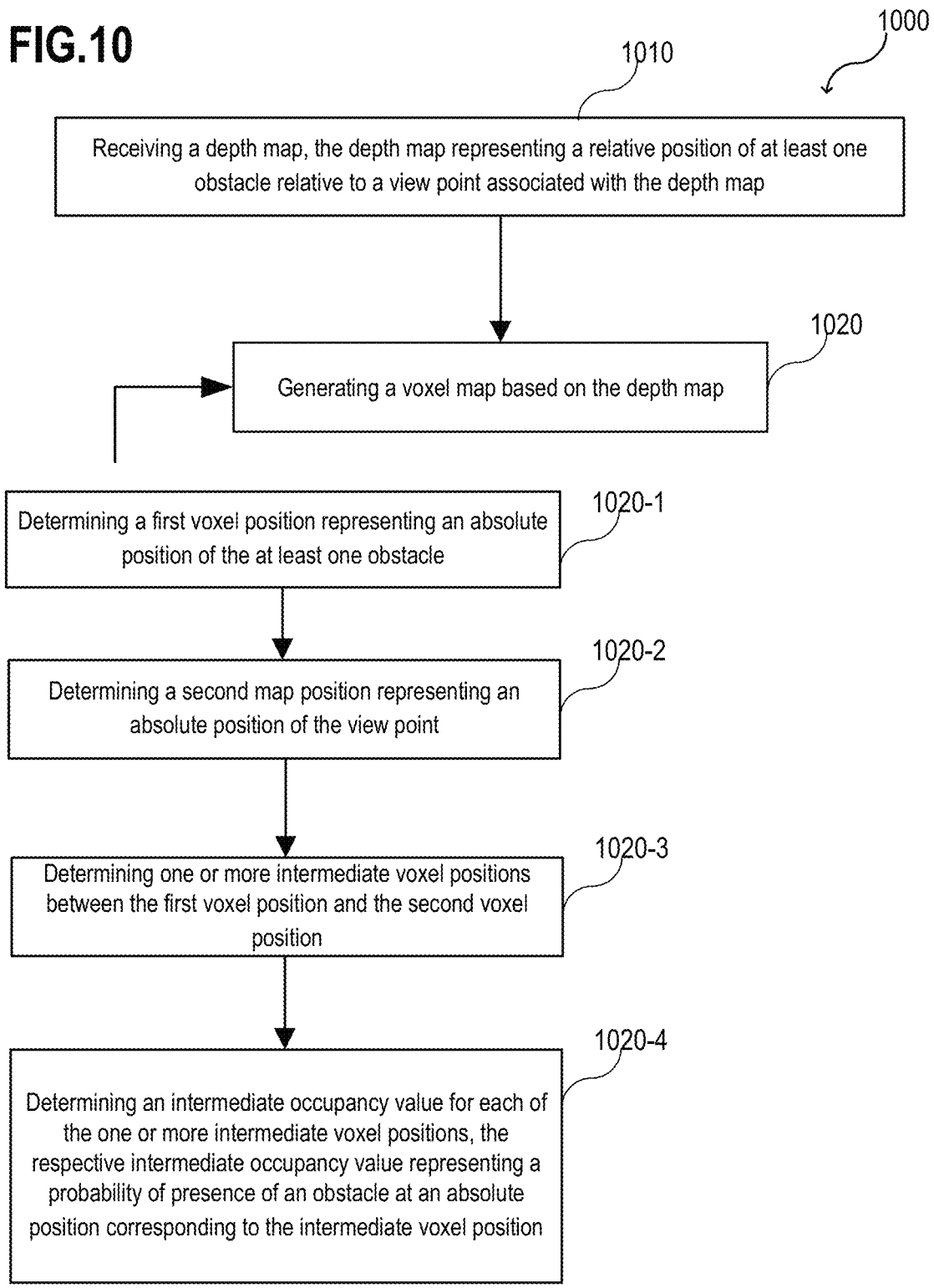
FIG. 10 shows a flow diagram of a method for generating an obstacle map, according to various aspects.

FIG. 10 shows a flow diagram of a method 1000 for generating an obstacle map, the method 1000 may include: in 1010, receiving a depth map, the depth map representing a relative position of at least one obstacle relative to a viewpoint associated with the depth map; and in 1020, generating a voxel map based on the depth map. The generation of the voxel map in 1020 may include: in 1020-1, determining a first voxel position representing an absolute position of the at least one obstacle; in 1020-2, determining a second voxel position representing an absolute position of the viewpoint; in 1020-3, determining one or more intermediate voxel positions between the first voxel position and the second voxel position; and, in 1020-4, determining an intermediate occupancy value for each of the one or more intermediate voxel positions, the respective intermediate occupancy value representing a probability of the presence of an obstacle at an absolute position corresponding to the intermediate voxel position.

According to various aspects, the depth map may include one or more depth images or generated based on one or more depth images. The one or more depth images may be provided by one or more depth cameras of the drone or any other vehicle. In some aspects, a viewpoint associated with the depth images or with a depth map may be defined by the position of the one or more depth cameras (or any other depth sensors that is used to provide the depth images or the depth map). In the case that the one or more depth cameras are mounted to a drone, the viewpoint associated with the depth images or the depth map may be defined by the position of the drone at the time of shooting the respective depth image.

Figure 11:
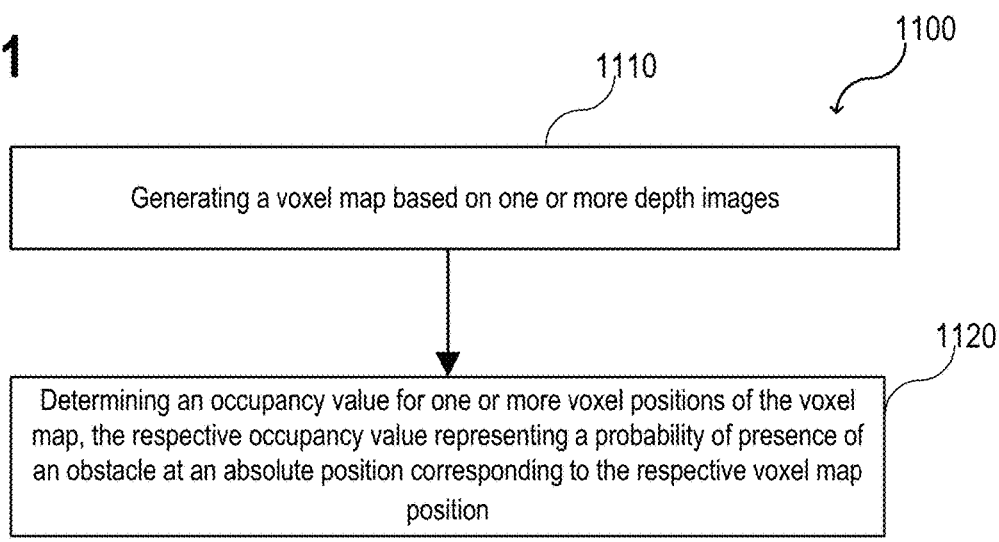
FIG. 11 shows a flow diagram of a method for generating an obstacle map, according to various aspects.

FIG. 11 shows a flow diagram of a method 1100 for generating an obstacle map, the method 1100 may include: in 1110, generating a voxel map based on one or more depth images; and in 1120, determining an occupancy value for one or more voxel positions of the voxel map, the respective occupancy value representing a probability of the presence of an obstacle at an absolute position corresponding to the respective voxel position.

Figure 12:
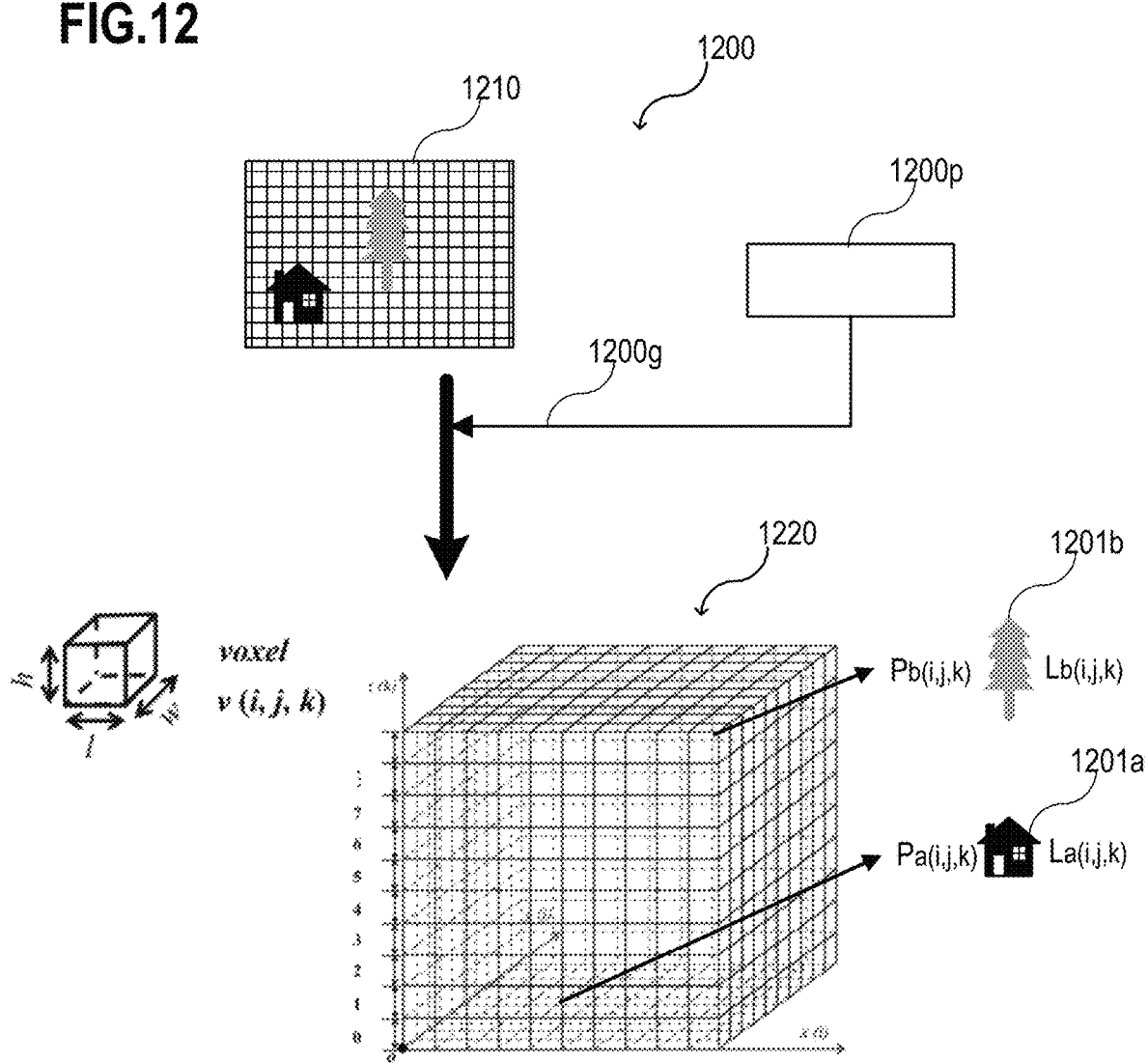
FIG. 12 shows an obstacle map generator in a schematic view, according to various aspects.

FIG. 12 shows an obstacle map generator 1200 in a schematic view, according to various aspects. The obstacle map generator 1200 may include one or more processors 1200p configured to generate 1200g a voxel map 1220 based on one or more depth images 1210. The one or more processors 1200p may be further configured to determine, for one or more voxel positions P(i,j,k) of the voxel map 1220, an occupancy value L(i,j,k). The respective occupancy value La(i,j,k), Lb(i,j,k) may represent a probability of the presence of an obstacle 1201a, 1201b at an absolute position corresponding to the respective voxel position Pa(i,j,k), Pb(i,j,k).

According to various aspects, the voxel map 1220 may include a plurality of voxels V(i,j,k) in a grid arrangement. Each of the voxels V(i,j,k) may represent a region in the real space with predefined dimensions, e.g. height h, length 1, and width w. According to various aspects, the voxels V(i,j,k) of the voxel map 1220 may represent absolute positions in the real space, or, in other words, each voxel position Pa(i,j,k), Pb(i,j,k) may be associated with a distinct absolute position in the real space. A movement of a vehicle may be controlled based on the voxel map 1220 to avoid collision with obstacles 1201a, 1201b in the real space.

According to various aspects, ray tracing may be used to determine the respective occupancy values assigned to voxels V(i,j,k) of the voxel map 1220, as described in more detail below.

FIG. 13A shows an obstacle map generator 1300 in a schematic view, according to various aspects. The obstacle map generator 1300 may include one or more processors 1300p configured to receive a depth map 1310. The depth map 1310 may represent a relative position of at least one obstacle 1301 relative to a viewpoint 1310v associated with the depth map 1310. According to various aspects, the one or more processors 1300p may be configured to generate 1300g a voxel map 1320 based on the depth map 1310.

Figure 13B:
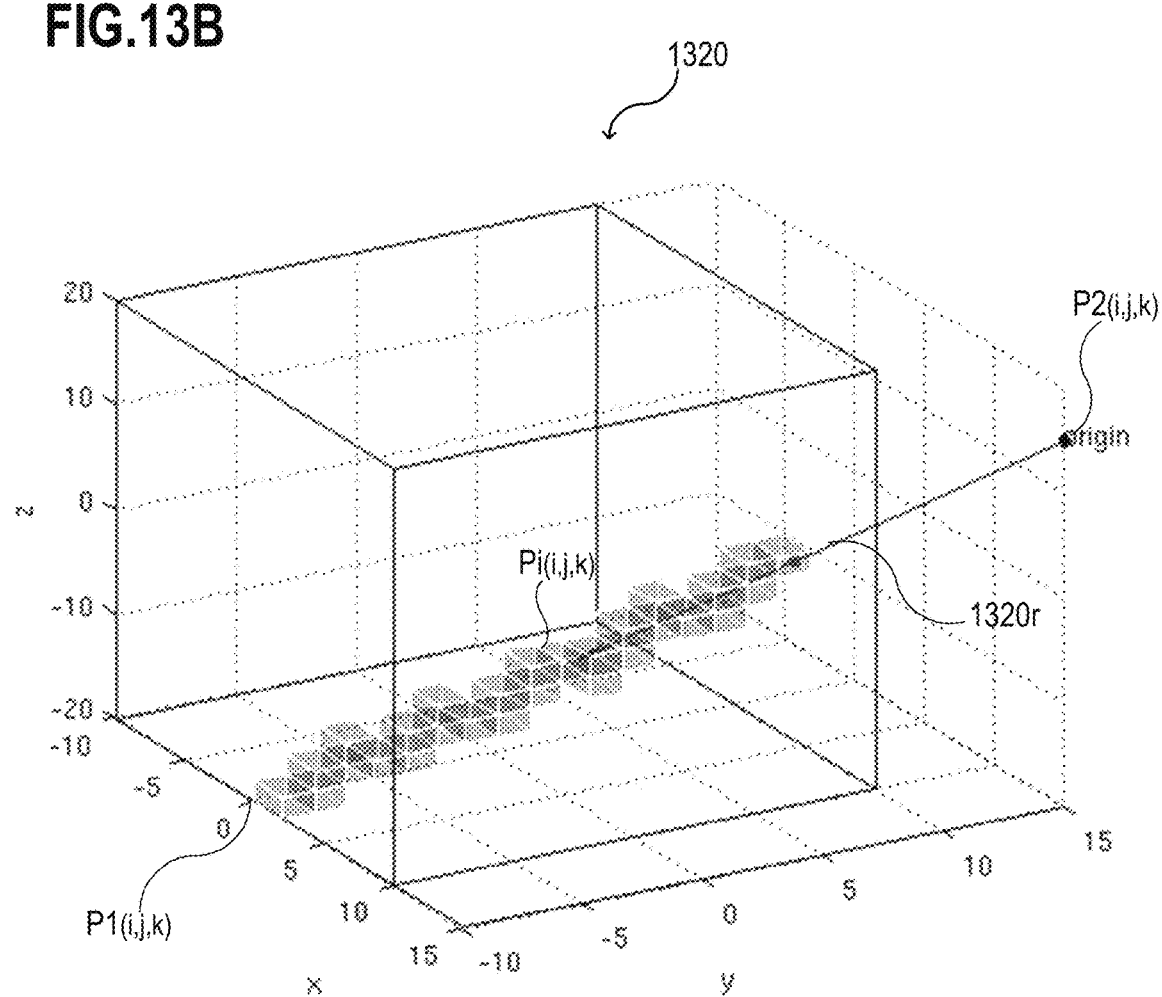

Several aspects of the determination of the voxel map 1320 may be based on ray tracing, as illustrated schematically in FIG. 13B. The generation of the voxel map 1320 may include determining a first voxel position P1(i,j,k) representing an absolute position of the at least one obstacle 1301 and determining a second voxel position P2(i,j,k) representing an absolute position of the viewpoint 1310v that is associated with the depth map 1310. Illustratively, the depth map 1310 may allow the assumption that there is an obstacle free space between a detected obstacle 1301 and the viewpoint 1310v.

According to various aspects, the generation of the voxel map 1320 may further include determining one or more intermediate voxel positions Pi(i,j,k) between the first voxel position P1(i,j,k) and the second voxel position P2(i,j,k).

Figure 13C:
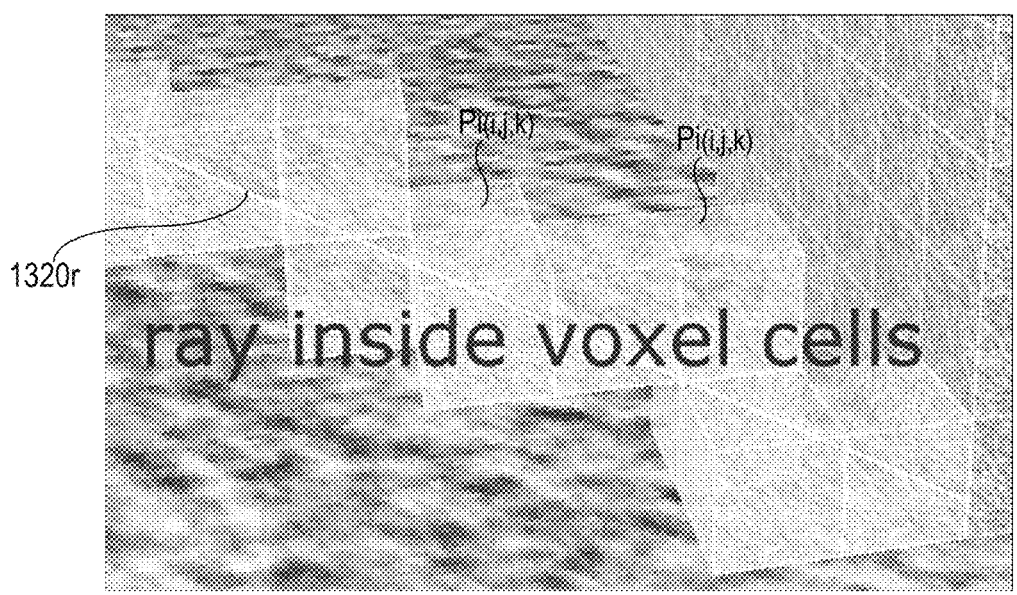

Further, an intermediate occupancy value Li(i,j,k) may be determined for each of the one or more intermediate voxel positions Pi(i,j,k), the respective intermediate occupancy value Li(i,j,k) may represent a probability of the presence of an obstacle at an absolute position corresponding to the intermediate voxel position Pi(i,j,k). The intermediate voxel positions Pi(i,j,k) may be determined by tracing a ray 1320r from the second voxel position P2(i,j,k) to the first voxel position P1(i,j,k), wherein each voxel V(i,j,k) that intersects with the ray 1320r may define one of the intermediate voxel positions Pi(i,j,k). FIG. 13C shows a schematic view of a ray 1320r intersecting the respective voxel cells Pi(i,j,k).

According to various aspects, the voxel position may be defined by a tupel of indices (i,j,k). Dependent on the number of voxels and the associated size of a voxel in the real space, the voxel map may cover a predefined region in the real space.

According to various aspects, a depth image may be received from a depth sensor, e.g. from a depth camera or a stereo camera system. Using the depth information from the depth image, the voxel map may be built with certain probabilities for a free or occupied voxel. In general, a voxel map may be a collection of individual voxels within a grid of, for example, three dimensions. For example, a voxel may have a pre-defined voxel size associated therewith, e.g. the voxel size may be set to a value in the range from about 1 cm to about 1 m. As an example, a voxel size of 20 cm and a voxel grid of 2048×2048×2048 voxels may cover a space of 409.6×409.6×409.6 m$^3$. Within this space, a probability value (also referred to as occupancy value) may be defined for each of the voxels. As an example, a value of zero may represent that there is no knowledge about the corresponding region, e.g. the region may be either free or occupied. A positive number may indicate that the corresponding region is occupied with a certain probability. A negative number may indicate that the corresponding region is free with a certain probability.

Ray tracing is a graphics technology that may be generally used for rendering photorealistic images. In these cases, ray tracing operates usually with free space and intersections are calculated mathematically between a ray and another object, for example a triangle. For example, a ray at origin (1.03, 3.28, 3.141) with the direction of (1.0, 0.0, 0.0) intersects an object at (1.03, 8.2, −3.04).

In the voxel space, ray tracing or sometimes called ray casting may be used as well. However, here all operations are happening with voxel blocks and not in free mathematical space. For example, a ray with the voxel origin indices of (3, 7, 9) and a certain direction might intersect the voxel block at the indices of (7, 8, 3). In voxel ray tracing, all rays may follow along the voxel cells until they hit their target or a maximum length criterion is satisfied, as illustrated in FIGS. 13B and 13C.

According to various aspects, a ray may be traced from the camera origin up to a final position of a voxel as projected from the depth images. For every voxel cell that gets intersected by the ray, the probability value may be modified to represent either a free region or an occupied region of the real space. For example, from the depth image it may be known that an obstacle may be located at a certain position with a 10 meters distance. In this case, all voxels along a ray to this position may be set to a probability that represents a free space.

According to various aspects, the voxel map 1320 may be generated from a sequence of depth images received over time, and the probability threshold for a free space may be increased with every other sample until a certain limit reached where a maximum free value is clamped. The same may be applied for an occupied region. If occupied space may be observed over multiple depth images, the probability of occupancy may be increased with every sample until it hits a maximum value of occupancy.

According to various aspects, for each voxel, the occupancy value may be incrementally increased upon determination of an occupied space associated with the voxel and incrementally decrease upon determination of a free space associated with the voxel. As an example, the minimal occupancy value may be −1 and the maximal occupancy value may be 1 and the change of the occupancy value may be 0.2 for a single determination. Illustratively, the respective voxels may be marked as occupied or free and, with each determination, the likelihood that the real space associated with the voxel is indeed occupied or free may increase/decrease with each determination. A first threshold and a second threshold may be associated with the occupancy values. When the occupancy value reaches the first threshold (e.g. an upper threshold, e.g. 0.7) the real space associated with the voxel may be considered to be occupied by an obstacle and when the occupancy value reaches the second threshold (e.g. a lower threshold, e.g. −0.7) the real space associated with the voxel may be considered to be free of obstacles.

It has to be noted that other implementations for the determination of the probability values are possible. According to various aspects, the determination of the probability values may include predefined curves that may correlated the probability values with the distance to the respective obstacle determined from the depth map, as illustrated in the FIGS. 14A to 14C.

Figure 14A:
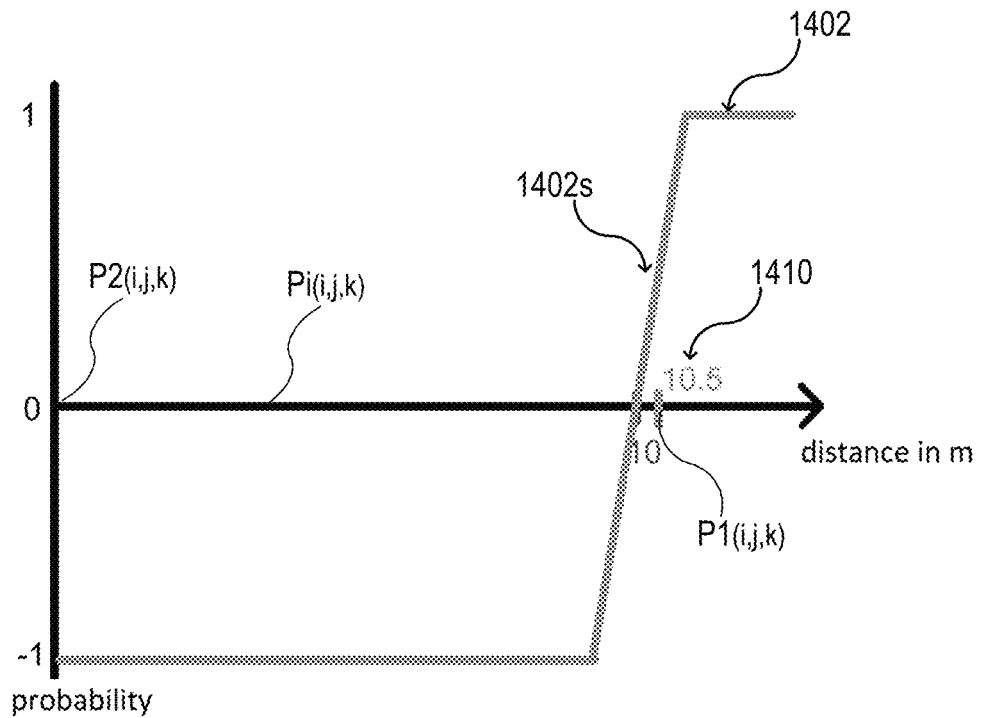
FIG. 14A and FIG. 14C show respectively a predefined function for determining probability values, according to various aspects.

FIG. 14A shows a predefined function 1402 for determining probability values, according to various aspects.

Between the second voxel position P2($i,j,k$) (e.g. associated with the viewpoint and/or the location of the depth image sensors and/or the location of the drone) and the first voxel position P1($i,j,k$) (e.g. associated with an obstacle detected via the depth images) the probability values may be set according to a predefined function, according to various aspects.

As an example, the probabilities may be determined for a given depth value 1410 of 10.5 meters determined from a depth image. A (e.g. linear) slope 1402s may be set in a way that the probability starts increasing from 9.5 meters upwards with the probability value of 0 (no information if occupied or free) at 10 meters up to the probability of 1 (definitely occupied) at 10.5 meters. At distances below 1.5 meters, the probability value may be set −1 (definitely free). Other values are possible in different implementations.

In other words, the distance of the obstacle and a predefined distribution of the probability value around the distance may be considered during determining the respective probability values. As illustrated in FIG. 14A, for adding the information from the depth value of 10.5 meters at a certain point in the voxel map, all voxel cells determined by ray tracing that are up to about 10 meters may be correlated with the probability value of −1, that represents that this area is very likely free. That value can be scaled further with the distance from the depth camera. As an example, close items may be more likely to have exact values compared to the ones further away. Closer to the obstacle (e.g. at a distance between 10 to 10.5 meters), the certainty that this space may be occupied may quickly rise. At a distance at 10.5 meters, the space may be definitely occupied as otherwise the depth value would not have been set to 10.5 meters. For ray tracing, the ray may be overshot by a one or more voxel blocks to set those also to be occupied.

Figure 14B:
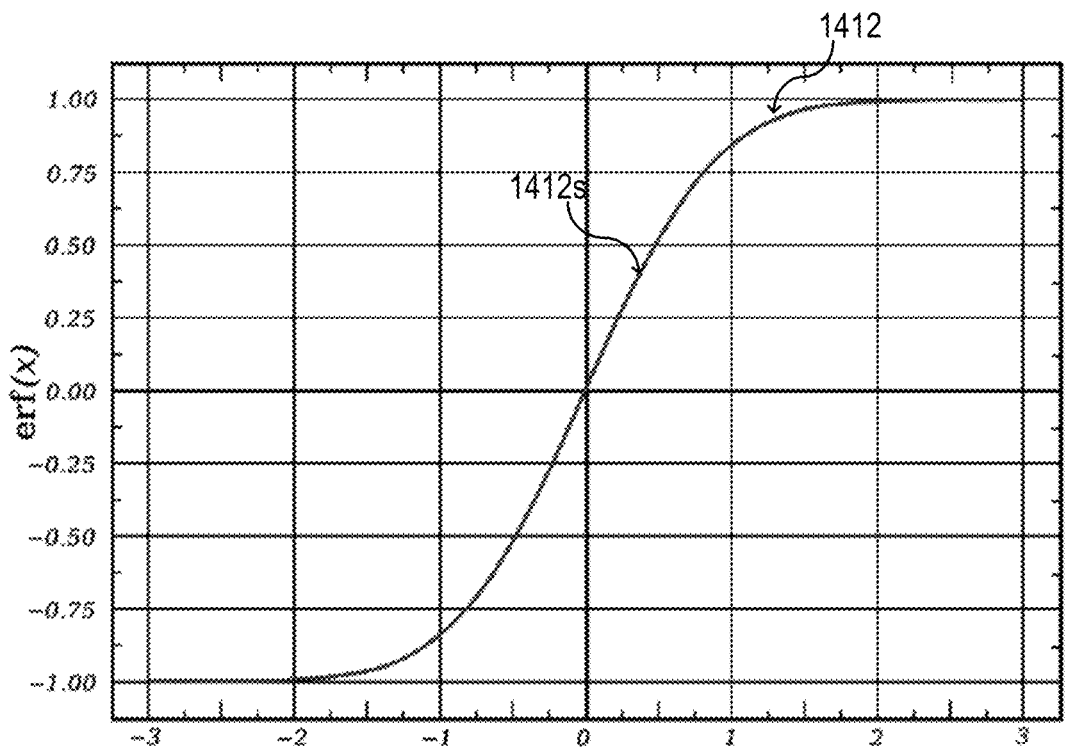

FIG. 14B shows another example for a predefined function 1412 (also referred to as error function) for determining probability values. As illustrated in FIG. 14B, an at least partially curved increase 1412s in the probability function may be used which may lead to more precise results as the completely linear slope 1402s shown in FIG. 14A. The inclination of the approximately linear part of the at least partially curved increase 1412s may be determined based on the distance from the point to the origin of the camera. This allows for a consideration of the depth error of a measurement from the depth camera (e.g. a stereo camera) that may grow quadratic with the distance.

A determination (e.g. a computation) of the probability values may be done for one or more depth cameras (e.g. one or more) stereo cameras running at, for example, 30 fps, and for thousands of rays for each of the one or more depth cameras. This may incur a significant computational burden on an embedded system of a drone.

Hence, one or more approximations may be used to, for example, reduce computational complexity. As an example, the distance computation for every single voxel may be approximated from the incremental step of the voxel-ray-tracing algorithm, which may inherently compute the distance from the viewpoint (e.g. the center of the camera) to a nearest facing side of the voxel. As another example, the error function (e.g. as shown exemplarily in FIG. 14B) may be approximated via a function that results in less computational burden (e.g. see FIG. 14C).

According to various aspects, a function that represents a curved probability model may be used for determination of the occupancy values (also referred to as probability values) of one or more voxels of the voxel map. The curved probability model may represent a probability that a point (e.g. a voxel position) is within a solid object.

Figure 14C:
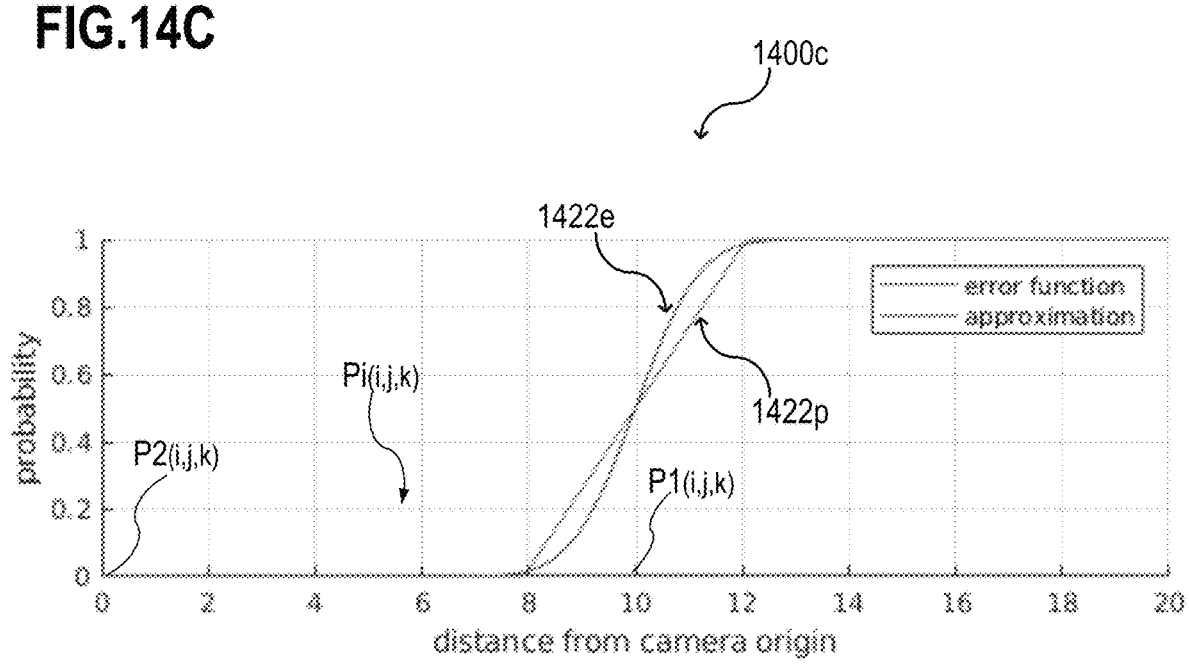

FIG. 14C shows a performance-optimized probability determination 1400c using an approximation for the error function 1422e without an offset, according to various aspects. The error function 1422e may be in some cases computed iteratively for every single voxel. According to various aspects, there may be only a small loss of precision if the error function 1422e is approximated by a saturated linear function 1422p (e.g. without offset). The computation for every voxel may then boils down to a single multiplication and two comparisons against a value of greater than 1 or smaller than −1.

According to various aspects, mapping the environment of a drone or any other at least partially autonomously controlled vehicle may be much more robust against outliers, for example fake depth data from a depth camera that may be generated by errors in the stereo matches. Outliers may not be geometrically consistent and, therefore, once the drone moves, the outliers will move in some other inconsistent way. The chances may be significant to obtain only valid depth data in the areas. As a space in front of a valid occupied space is illustratively shot free in the voxel map via ray tracing, any outlier obstacles will be freed away.

Further, using the algorithms and functions described herein allows for a consideration of dynamic changes within the voxel map. For example, in the case that a drone encounters another drone in its field of view, the drone would first stop or move backwards to not hit such an obstacle. However, once the other drone has moved away, the background behind the previous position of the other drone becomes visible again. As the ray up to that further distance is traced, the space that was previously occupied by the other drone is detected to be free of obstacles.

Another aspect of the algorithms and functions described herein may be that in that case that an object is detected far away, e.g. at 60 meters of distance, there may be usually only lower confidence in the depth accuracy given today's depth sensors. However, in some aspects the knowledge of a limited measurement accuracy is considered during the generation of the voxel map. For example, if an object is detected at a distance greater than a predefined distance limit (e.g. greater than about 20 meters), an probability value may be assigned to the intermediated voxel positions that represents a free space at least within the predefined distance limit. If the object was, for example, really at a distance of 50 or 60 meters, this may be not relevant in such a case. Illustratively, probability values of voxels may be only edited with up to a predefined distance threshold, e.g. up to a distance of 20 meters.

According to various aspects, the one or more processors 1200p, 1300p may be respectively part of the unmanned aerial vehicle 100 or the functions provided by the one or more processors 1200p, 1300p may be implemented by the one or more processors 102p of the unmanned aerial vehicle 100.

According to various aspects, a depth map, as described herein, may include or may be generated from one or more depth images. The one or more depth images may be generated by any suitable sensor or sensor system. In some aspects, the one or more depth images may be generated by one or more sensors of a vehicle, e.g. of the unmanned aerial vehicle 100.

In the following, various examples are described that may refer to one or more aspects described herein, e.g. to one or more aspects of a voxel map generation described with reference to FIGS. 10, 11, 12, 13A to 13C, and 14A to 14C.

Example 1 is an obstacle map generator, including: one or more processors configured to receive a depth map, the depth map representing a relative position of at least one obstacle relative to a viewpoint associated with the depth map, generate a voxel map based on the depth map. In some aspects, the generation of the voxel map may include: determining a first voxel position representing an absolute position of the at least one obstacle, determining a second voxel position representing an absolute position of the viewpoint, determining one or more intermediate voxel positions between the first voxel position and the second voxel position, and determining an intermediate occupancy value for each of the one or more intermediate voxel positions, the respective intermediate occupancy value representing a probability of the presence of an obstacle at an absolute position corresponding to the intermediate voxel position.

In example 2, the obstacle map generator of example 1 may optionally further include that the generation of the voxel map further includes determining a first occupancy value for the first voxel position, the first occupancy value representing a probability of the presence of the at least one obstacle at the absolute position of the at least one obstacle.

In example 3, the obstacle map generator of example 2 may optionally further include that the first occupancy value represents a higher probability than the respective intermediate occupancy value.

In example 4, the obstacle map generator of any one of examples 1 to 3 may optionally further include that the determination of the one or more intermediate voxel positions includes tracing a ray from the second voxel position to the first voxel position, wherein each voxel at the one or more intermediate voxel positions intersect with the traced ray.

In example 5, the obstacle map generator of any one of examples 1 to 4 may optionally further include that the determination of the respective intermediate occupancy value includes summing up one or more occupancy values determined consecutively for the respective voxel position.

In example 6, the obstacle map generator of any one of examples 1 to 5 may optionally further include that the first occupancy value and the respective intermediate occupancy value are in a range between a first boundary value and a second boundary value. In some aspects, the first boundary value represents a definite presence of free space and the second boundary value represents a definite presence of an obstacle.

In example 7, the obstacle map generator of any one of examples 1 to 6 may optionally further include that the first occupancy value and the respective intermediate occupancy value are determined based on a measurement accuracy associated with the depth map.

In example 8, the obstacle map generator of any one of examples 1 to 7 may optionally further include that the depth map includes one or more depth images received from one or more depth image sensors.

In example 9, the obstacle map generator of any one of examples 1 to 8 may optionally further include that the determination of the first voxel position includes mapping the depth map to the voxel map based on one or more mapping parameters.

In example 10, the obstacle map generator of any one of examples 1 to 9 may optionally further include that the one or more mapping parameters represent a field of view and a viewing direction associated with the depth map and the absolute position of the viewpoint.

In example 11, the obstacle map generator of any one of examples 1 to 10 may optionally further include that the determination of the respective intermediate occupancy value is based on a predefined sequence of occupancy values.

Example 12 is an obstacle map generator configured to receive a depth map, the depth map representing an obstacle in the real space and a depth value assigned to the obstacle, the depth value representing a distance of the obstacle from a viewpoint associated with the depth map, receive an absolute position of the viewpoint, generate an obstacle map (e.g. a voxel map) based on the depth map. The generation of the obstacle map (e.g. the voxel map) may include: determining a first voxel at a first voxel position that represents the obstacle, determining, based on the received absolute position of the viewpoint, a second voxel at a second voxel position that represents the viewpoint, determining a set of intermediate voxels at intermediate voxel positions between the first voxel position and the second voxel position, each voxel of the set of intermediate voxels intersecting with a single ray traced from the second voxel position to the first voxel position, assigning a first occupancy value to the first voxel, and assigning a second occupancy value to one or more voxels of the set of intermediate voxels, the first occupancy value representing a greater probability of the presence of an obstacle than the second occupancy value.

Example 13 is an obstacle map generator configured to generate an obstacle map from one or more depth images, the obstacle map including map positions representing absolute positions in the real space and the one or more depth images representing relative positions of one or more obstacles, determine from the one or more depth images one or more first map positions representing absolute positions of the one or more obstacles, determine a second map position associated with a viewpoint of the one or more depth images, determine, for each of the one or more first map positions, a set of intermediate map positions between the respective first map position and the second map position, each intermediate map position of the set of intermediate map positions intersecting with a single ray traced from the second map position to the respective first map position, assign a first occupancy value to the one or more first map position, the first occupancy value representing a first probability of the presence of the respective obstacle, and assign a second occupancy value to one or more intermediate map positions of the respectively determined set of intermediate map positions, the second occupancy value representing a second probability of the presence of an obstacle, wherein the second probability is less than the first probability.

The obstacle map generator of example 12 or 13 may include one or more processors or a computing system to carry out the respective functions associated with the generation of the obstacle map.

Example 14 is a collision avoidance system, the collision avoidance system including an obstacle map generator of any one of examples 1 to 13 configured to generate an obstacle map (e.g. to generate a voxel map). The collision avoidance system may further include one or more processors configured to instruct a control of a vehicle based on the generated obstacle map (e.g. the generated voxel map).

Example 15 is a collision avoidance system, the collision avoidance system including: one or more depth imaging sensors configured to provide a depth image of the vicinity of the one or more depth imaging sensors, the depth image including a plurality of pixels, wherein a depth value is assigned to each pixel of the plurality of pixels; and one or more processors configured to determine, from the depth image, one or more image objects associated with one or more obstacles in the vicinity of the one or more depth imaging sensors, each of the one or more image objects including one or more pixels and one or more depth values assigned to the one or more pixels, determine for each of the one or more image objects direction information and distance information, wherein the direction information represents a direction pointing from the one or more depth imaging sensors to the obstacle that correspond to the respective image object and wherein the distance information represents a distance to the obstacle along the direction, determine from the direction information and the distance information an absolute position of the obstacle and an absolute position of a viewpoint associated with the depth image based on positional information associated with the one or more depth imaging sensors, generate a voxel map, wherein the generation of the voxel map includes: determining one or more first voxels representing the absolute position of the obstacle, determining a second voxel representing the absolute position of the viewpoint, determining, for each of the one or more first voxels, a set of intermediate voxels between the respective first voxel and the second voxel, each voxel of the set of intermediate voxels intersecting with a single ray traced from the second voxel to the respective first voxel, assigning a first occupancy value to the one or more first voxels, the first occupancy value representing a probability of the presence of the obstacle, and assigning a second occupancy value to one or more intermediate voxels of the respectively determined set of intermediate voxels, the second occupancy value representing a probability of the presence of free space, and instruct a control of a vehicle based on the generated voxel map.

Example 16 is a collision avoidance system, the collision avoidance system including: one or more processors configured to generate a map from one or more depth images, the map including map positions representing absolute positions in the real space and the one or more depth images represents relative positions of one or more obstacles. The generation of the map may include: determining from the one or more depth images one or more first map positions representing absolute positions of the one or more obstacles, determining a second map position associated with a viewpoint of the one or more depth images, determining, for each of the one or more first map positions, a set of intermediate map positions between the respective first map position and the second map position, each intermediate map position of the set of intermediate map positions intersecting with a single ray traced from the second map position to the respective first map position, assigning a first occupancy value to the one or more first map position, the first occupancy value representing a probability of the presence of an obstacle, and assigning a second occupancy value to one or more intermediate map positions of the respectively determined set of intermediate map positions, the second occupancy value representing a probability of the presence of free space. The one or more processors may be further configured to instruct a control of a vehicle based on the generated map.

Example 17 is a collision avoidance system, the collision avoidance system including: one or more depth image sensors configured to receive depth information of the vicinity of the one or more depth image sensors and generate one or more depth images from the received depth information, the one or more depth images including at least one image object that represents an obstacle in the vicinity of the one or more depth image sensors and a depth value assigned to the at least one image object, the depth value representing a distance of the obstacle from the one or more depth image sensors; one or more processors configured to determine an absolute position of the one or more depth image sensors at the time of the reception of the depth information, generate a three-dimensional voxel map, determine, based on the one or more depth images, one or more first voxels at one or more first voxel positions that correspond to an absolute position of the obstacle, determine, based on the determined absolute position of the one or more depth image sensors, a second voxel at a second voxel position that represents the absolute position, determine, for each of the one or more first voxels, a set of intermediate voxels at intermediate voxel positions between the respective first voxel position and the second voxel position, each voxel of the set of intermediate voxels intersecting with a single ray traced from the second voxel position to the respective first voxel position, assign a first occupancy value to the one or more first voxels, the first occupancy value representing a probability of the presence of the obstacle, and assign a second occupancy value to one or more intermediate voxels of the respectively determined set of intermediate voxels, the second occupancy value representing a probability of the presence of free space.

Example 18 is a vehicle, the vehicle including an obstacle map generator of any one of examples 1 to 13.

Example 19 is a vehicle, the vehicle including a collision avoidance system of any one of examples 14 to 17.

Example 20 is a vehicle, the vehicle including: one or more depth image sensors configured to receive depth information of the vicinity of the vehicle and to generate one or more depth images from the received depth information, the one or more depth images representing a relative position of at least one obstacle relative to a viewpoint associated with the one or more depth image sensors; and one or more processors configured to generate a voxel map based on the one or more depth images. The generation of the voxel map may include: determining a first voxel position representing an absolute position of the at least one obstacle, determining a second voxel position representing an absolute position of the viewpoint, determining one or more intermediate voxel positions between the first voxel position and the second voxel position, and determining an intermediate occupancy value for each of the one or more intermediate voxel positions, the respective intermediate occupancy value representing a probability of the presence of an obstacle at an absolute position corresponding to the intermediate voxel position.

Example 21 is a vehicle, the vehicle including: one or more depth image sensors configured to receive depth information of the vicinity of the vehicle and to generate one or more depth images from the received depth information, the one or more depth images including at least one image object that represents an obstacle in the vicinity of the vehicle and a depth value assigned to the at least one image object, the depth value representing a distance of the obstacle from the vehicle; one or more processors configured to determine an absolute position of the vehicle at the time of the reception of the depth information, and generate a three-dimensional voxel map. The generation of the three-dimensional voxel map may include: determining, based on the one or more depth images, one or more first voxels at one or more first voxel positions that correspond to an absolute position of the obstacle, determining, based on the determined absolute position of the vehicle, a second voxel at a second voxel position that represents the absolute position, determining, for each of the one or more first voxels, a set of intermediate voxels at intermediate voxel positions between the respective first voxel position and the second voxel position, each voxel of the set of intermediate voxels intersecting with a single ray traced from the second voxel position to the respective first voxel position, determining a first occupancy value for the one or more first voxels, the first occupancy value representing a probability of the presence of the obstacle, and determining a second occupancy value for one or more intermediate voxels of the respectively determined set of intermediate voxels, the second occupancy value representing a probability of the presence of free space.

In example 22, the vehicle of any one of examples 18 to 21 may optionally further include that the one or more processors are further configured to control movement of the vehicle based on the generated voxel map.

Example 23 is a method for generating an obstacle map, the method including: receiving a depth map, the depth map representing a relative position of at least one obstacle relative to a viewpoint associated with the depth map; and generating a voxel map based on the depth map, the generation of the voxel map may include: determining a first voxel position representing an absolute position of the at least one obstacle; determining a second voxel position representing an absolute position of the viewpoint; determining one or more intermediate voxel positions between the first voxel position and the second voxel position; and determining an intermediate occupancy value for each of the one or more intermediate voxel positions, the respective intermediate occupancy value representing a probability of the presence of an obstacle at an absolute position corresponding to the intermediate voxel position.

In example 24, the method of example 23 may optionally further include that the generation of the voxel map further includes determining a first occupancy value for the first voxel position, the first occupancy value representing a probability of the presence of the at least one obstacle at the absolute position of the at least one obstacle.

In example 25, the method of example 24 may optionally further include that the first occupancy value represents a higher probability than the respective intermediate occupancy value.

In example 26, the method of any one of examples 23 to 25 may optionally further include that the determination of the one or more intermediate voxel position includes tracing a ray from the second voxel position to the first voxel position. Each voxel at the one or more intermediate voxel positions may intersect with the traced ray.

In example 27, the method of any one of examples 23 to 26 may optionally further include that the determination of the respective intermediate occupancy value includes summing up one or more occupancy values determined consecutively for the respective voxel position.

In example 28, the method of any one of examples 23 to 27 may optionally further include that the first occupancy value and the respective intermediate occupancy value are in a range between a first boundary value and a second boundary value. The first boundary value may represent a definite presence of free space. The second boundary value may represent a definite presence of an obstacle.

In example 29, the method of any one of examples 23 to 28 may optionally further include that the first occupancy value and the respective intermediate occupancy value are determined based on a measurement accuracy associated with the depth map.

In example 30, the method of any one of examples 23 to 29 may optionally further include that the depth map includes one or more depth images received from one or more depth image sensors.

In example 31, the method of any one of examples 23 to 30 may optionally further include that the determination of the first voxel position includes mapping the depth map to the voxel map based on one or more mapping parameters.

In example 32, the method of example 31 may optionally further include that the one or more mapping parameters represent a field of view and a viewing direction associated with the depth map and the absolute position of the viewpoint.

In example 33, the method of any one of examples 23 to 32 may optionally further include that the determination of the respective intermediate occupancy value is based on a predefined sequence of occupancy values.

Example 34 is a method for generating an obstacle map, the method including: generating a voxel map based on a depth map; and determining, for one or more voxel positions of the voxel map, an occupancy value, the respectively determined occupancy value representing a probability of the presence of an obstacle at an absolute position corresponding to a voxel position in the voxel map.

In example 35, the method of example 32 may optionally further include: storing the determined occupancy value assigned to the corresponding voxel position in the voxel map.

In example 36, the method of example 34 or 35 may optionally further include that the determination of the respective occupancy value includes: determining a first voxel position representing the absolute position of the obstacle; determining a second voxel position representing an absolute position of a viewpoint associated with the depth map; determining one or more intermediate voxel positions between the first voxel position and the second voxel position; and determining an intermediate occupancy value for each of the one or more intermediate voxel positions, the respective intermediate occupancy value representing a probability of the presence of an obstacle at an absolute position corresponding to the intermediate voxel position.

In example 37, the method of example 36 may optionally further include that the generation of the voxel map further includes determining a first occupancy value for the first voxel position, the first occupancy value representing a probability of the presence of the at least one obstacle at the absolute position of the at least one obstacle.

In example 38, the method of example 37 may optionally further include that the first occupancy value represents a higher probability than the respective intermediate occupancy value.

In example 39, the method of any one of examples 36 to 38 may optionally further include that the determination of the one or more intermediate voxel position includes tracing a ray from the second voxel position to the first voxel position. Each voxel at the one or more intermediate voxel positions may intersect with the traced ray.

In example 40, the method of any one of examples 34 to 39 may optionally further include that the determination of the respective occupancy value includes summing up one or more occupancy values determined consecutively for the respective voxel position.

In example 41, the method of any one of examples 36 to 40 may optionally further include that the first occupancy value and the respective intermediate occupancy value are in a range between a first boundary value and a second boundary value. The first boundary value may represent a definite presence of free space. The second boundary value may represent a definite presence of an obstacle.

In example 42, the method of any one of examples 34 to 41 may optionally further include that the respective occupancy value is determined based on a measurement accuracy associated with the depth map.

In example 43, the method of any one of examples 34 to 42 may optionally further include that the depth map includes one or more depth images received from one or more depth image sensors.

In example 44, the method of any one of examples 36 to 43 may optionally further include that the determination of the first voxel position includes mapping the depth map to the voxel map based on one or more mapping parameters.

In example 45, the method of example 44 may optionally further include that the one or more mapping parameters represent a field of view and a viewing direction associated with the depth map and the absolute position of the viewpoint.

In example 46, the method of any one of examples 36 to 45 may optionally further include that the determination of the respective intermediate occupancy value is based on a predefined function.

Example 47 is a method for obstacle avoidance, the method including generating an obstacle map an according to any one of examples 34 to 46. The method of example 47 may further include generating a collision free path of movement based on the generated obstacle map.

Example 48 is a method for operating a vehicle, the method including generating an obstacle map an according to any one of examples 34 to 46. The method of example 48 may further include controlling movement of the vehicle based on the generated obstacle map.

Example 47 is an obstacle map generator, including: one or more processors configured to generate a voxel map based on a depth map, and determine, for one or more voxel positions of the voxel map, an occupancy value, the respective occupancy value representing a probability of the presence of an obstacle at an absolute position corresponding to the respective voxel position.

In example 48, the obstacle map generator of example 47 may optionally further include one or more memories. The one or more processors may be further configured to store, in the one or more memories, the determined occupancy value assigned to the corresponding voxel position in the voxel map.

In example 49, the obstacle map generator of example 47 or 48 may optionally further include that the determination of the respective occupancy value includes: determining a first voxel position representing the absolute position of the obstacle; determining a second voxel position representing an absolute position of a viewpoint associated with the depth map; determining one or more intermediate voxel positions between the first voxel position and the second voxel position; and determining an intermediate occupancy value for each of the one or more intermediate voxel positions, the respective intermediate occupancy value representing a probability of the presence of an obstacle at an absolute position corresponding to the intermediate voxel position.

In example 50, the obstacle map generator of example 49 may optionally further include that the generation of the voxel map further includes determining a first occupancy value for the first voxel position. The first occupancy value may represent a probability of the presence of the at least one obstacle at the absolute position of the at least one obstacle.

In example 51, the obstacle map generator of example 50 may optionally further include that the first occupancy value represents a higher probability than the respective intermediate occupancy value.

In example 52, the obstacle map generator of any one of examples 49 to 51 may optionally further include that the determination of the one or more intermediate voxel position includes tracing a ray from the second voxel position to the first voxel position. Each voxel at the one or more intermediate voxel positions may intersect with the traced ray.

In example 53, the obstacle map generator of any one of examples 47 to 52 may optionally further include that the determination of the respective occupancy value includes summing up one or more occupancy values determined consecutively for the respective voxel position.

In example 54, the obstacle map generator of any one of examples 47 to 53 may optionally further include that the first occupancy value and the respective intermediate occupancy value are in a range between a first boundary value and a second boundary value. The first boundary value may represent a definite presence of free space. The second boundary value may represent a definite presence of an obstacle.

In example 55, the obstacle map generator of any one of examples 47 to 54 may optionally further include that the respective occupancy value is determined based on a measurement accuracy associated with the depth map.

In example 56, the obstacle map generator of any one of examples 47 to 55 may optionally further include that the depth map includes one or more depth images received from one or more depth image sensors.

In example 57, the obstacle map generator of any one of examples 49 to 56 may optionally further include that the determination of the first voxel position includes mapping the depth map to the voxel map based on one or more mapping parameters.

In example 58, the obstacle map generator of example 57 may optionally further include that the one or more mapping parameters represent a field of view and a viewing direction associated with the depth map and the absolute position of the viewpoint.

In example 59, the obstacle map generator of any one of examples 49 to 58 may optionally further include that the determination of the respective intermediate occupancy value is based on a predefined function.

Example 60 is a collision avoidance system, including an obstacle map generator of any one of examples 47 to 59 configured to generate a voxel map. The collision avoidance system of example 60 may further include one or more processors configured to generate a collision free path of movement based on the generated voxel map.

Example 61 is a vehicle, including a collision avoidance system of example 60 to generate a collision free path of movement. The vehicle of example 61 may further include one or more processors configured to control movement of the vehicle based on the generated collision free path of movement.

Example 62 is a vehicle, including an obstacle map generator of any one of examples 47 to 59 configured to generate a voxel map. The vehicle of example 62 may further include one or more processors configured to control movement of the vehicle based on the generated voxel map.

In the following, a hybrid depth sensing function is described that may allow to compensate fake depth values (e.g. due to an error in stereo matching of two corresponding images of a stereo camera) from depth image sensors. In general, a drone or any other vehicle may include an obstacle avoidance function based on depth images. Depth cameras may be used in scenarios like robots, virtual reality, and in drone products. To generate depth images fast and efficiently, the depth camera may include a left and a right camera module that take corresponding images at the same time. Based in the two corresponding images, a stereo matching algorithm may be used to estimate the distance of one or more objects from the depth camera.

Figure 15:
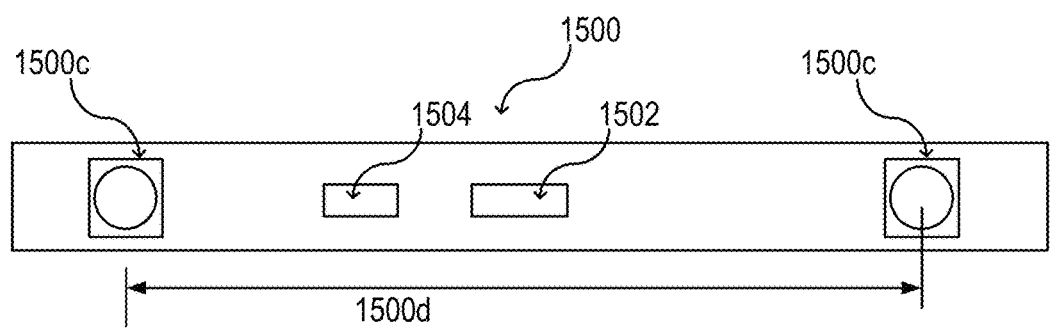
FIG. 15 shows a sensor system in a schematic view, according to various aspects.

FIG. 15 shows a sensor system 1500 in a schematic view, according to various aspects. The sensor system 1500 may include one or more depth image sensors. In some aspects, the sensor system 1500 may be or may include a depth imaging system, e.g. depth camera.

As an example, the sensor system 1500 may include at least two camera modules 1500c arranged spaced apart from one another to provide a first image (e.g. a left image) and a second image (e.g. a right image) from a scene at the same time. The at least two camera modules 1500c may be configured to detect light in the visible range and/or in the infrared range.

The sensor system 1500 may include a computing system, e.g. one or more processors 1502 and one or more memories 1504. The computing system may be configured to determine (e.g. estimate) the depth of one or more objects within the field of view of the sensor system 1500. For example, in the case that a certain image feature from the left image is found in the right image at almost the same image position, it can be conclude that an object corresponding to the detected image feature is far away from the sensor system 1500 since the offset 1500d between the two camera modules 1500c has no noticeable impact on the image position of the detected image feature that corresponds to the object located within the field of view of the sensor system 1500. In another example, a certain image feature that is found in the left image is detected a certain amount of pixels away in the right image. In this case, it may be conclude that the object may be near the sensor system. Through mathematics (e.g. involving a stereo baseline, a focal length, one or more lens distortion models, etc.), an accurate depth value for one or more objects located within the field of view of the sensor system 1500 may be determined (e.g. calculated).

However, conventional stereo matching algorithms may not operate without errors. For example, in outdoor areas without a significant texture, the camera may not find features and may not provide a result. Also for repetitive structures like tiles, grids, etc., the algorithms may not clearly differentiate which feature from one image matches the feature in the other image. As an example, a fake depth may be determined due to an uncertainty in the case that a feature may correspond to more than one same looking feature. Unfortunately, this may happen quite frequently on devices (e.g. stereo cameras) used for obstacle detection.

Figure 16:
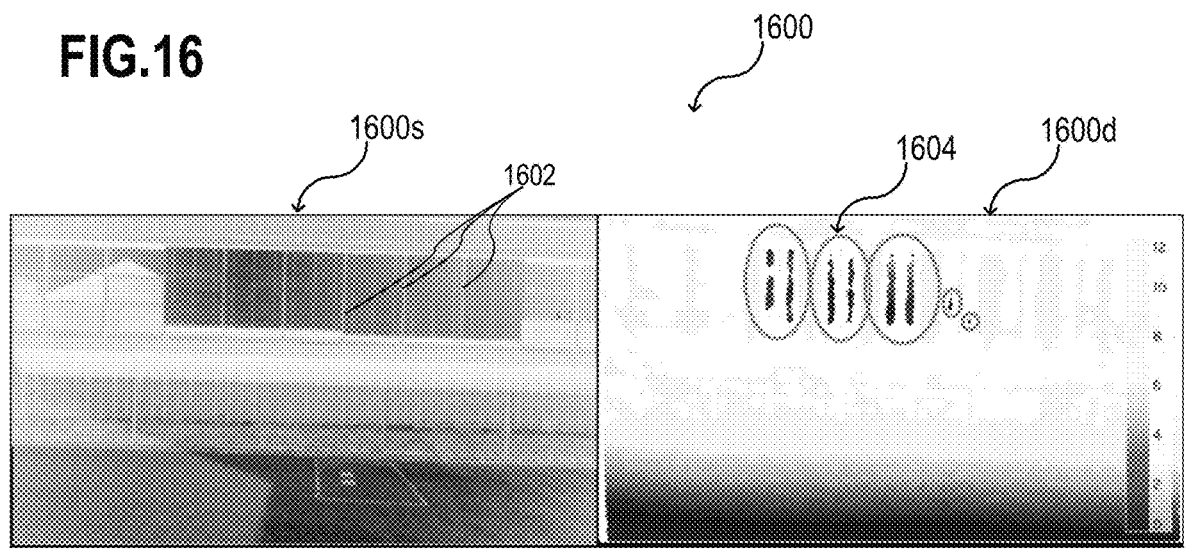
FIG. 16 shows an image of a scene and a corresponding depth image, according to various aspects.

FIG. 16 shows an image 1600s of a scene and a corresponding depth image 1600d. The repetitive structures of blinds 1602, for example, may be interpreted as close stereo matched features 1604 and, therefore, wrong depth values are determined. In a similar way, other structures as, for example, curtains, walls, doors, etc. may be interpreted wrongly.

One problem of such fake depth data may be that it cannot be detected reliably without running another performance intensive stereo algorithm on the CPU/GPU, which may defy the use case of an integrated depth sensor.

According to various aspects, a safety buffer (e.g. about five meters) may be created around a drone to avoid that the drone may crash into solid objects or any other obstacle. If an object may be located closer than that safety buffer, the drone may be configured to move away from this object. However, with close fake depth data the drone may be pushed away from a fake obstacle though there is no real obstacle. This may stop a smooth flight towards an object and have the drone change its course without reasonable explanation for the pilot. To minimize the impact of fake depth, the one or more parameters of a depth camera (e.g. one or more visual presets of an Intel® RealSense™ Depth Camera) or any other depth imaging sensor system may be tuned. According to various aspects, a satisfying working solution for the obstacle detection was found based on a hybrid depth sensing approach, which is described in more detail below.

In this disclosure, we present a hybrid depth sensing approach that toggles between strict depth settings to avoid fake depth values and for a brief time a more relaxed depth setting to fill in the details that are missing in the strict setting.

The hybrid depth sensing approach may provide satisfying results for a conventional stereo camera to implement obstacle detection and avoidance on a drone or any other at least partially autonomously operating vehicle. The conventional stereo camera setup may include, for example, a depth camera, e.g. an Intel® RealSense™ Depth Camera. As an example, the D400 series (e.g. including the D415, D435, as examples) of Intel® RealSense™ Depth Cameras may use stereo vision to calculate depth. According to various aspects, an Intel® RealSense™ Depth Camera may be operated in such a configuration that fake depth values may be amortized while still enough details are available of the surroundings. According to various aspects, an operation mode of an Intel® Real Sense™ Depth Camera may be modified by changing the Visual-Presets.

Figure 17:
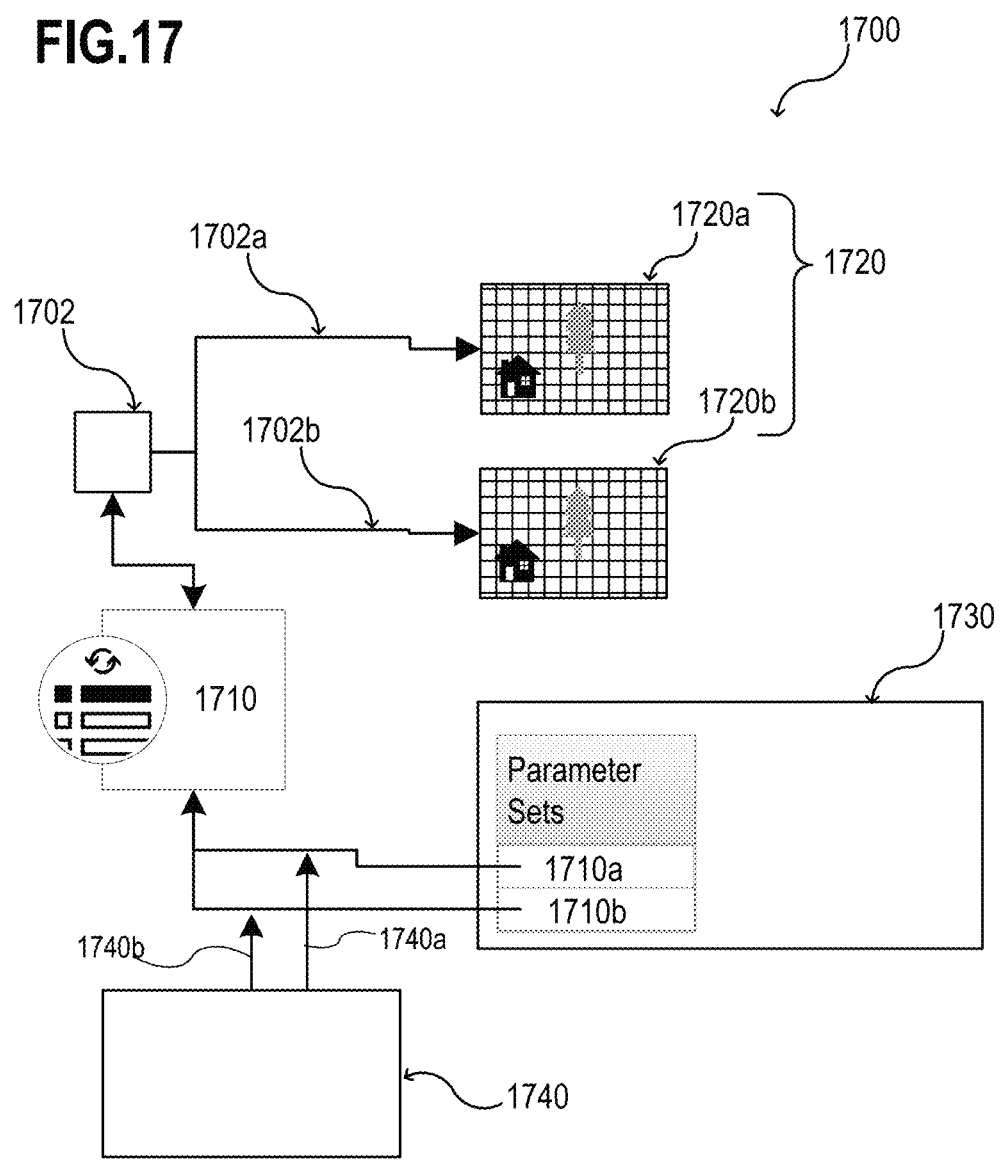
FIG. 17 shows a depth imaging system in a schematic view, according to various aspects.

FIG. 17 shows a depth imaging system 1700 in a schematic view, according to various aspects. The depth imaging system 1700 may include, one or more depth image sensors 1702 configured to generate depth images 1720 in accordance with a set of operation parameters 1710. The depth imaging system 1700 may further include one or more memories 1730 including a first set of predefined parameters 1710a and a second set of predefined parameters 1710b stored therein. The first set of predefined parameters 1710a may be associated with a first operation mode 1702a of the one or more depth sensors 1702 and the second set of predefined parameters 1710b may be associated with a second operating mode 1702b of the one or more depth image sensors 1702. According to various aspects, the first operation mode 1702a may be a high-accuracy operation mode and the second operation mode 1702b may be a high-density operation mode. In the high-density operation mode, depth images may be generated with a higher fill factor than in the high-accuracy operation mode. However, the high-accuracy operation mode may allow the generation of depth images being substantially free of fake depth information.

According to various aspects, the depth imaging system 1700 may further include one or more processors 1740 configured to switch alternatingly between the first operation mode 1702a and the second operation mode 1702b. The one or more processors 1740 may be configured to select 1740a the first set of predefined parameters 1710a as the set of operation parameters 1710 to set the first operation mode 1702a or, in other words, to allow an operation of the depth imaging system 1700 (e.g. the one or more depth images sensors 1702) in the first operation mode 1702a. And, the one or more processors 1740 may be further configured to select 1740b the second set of predefined parameters 1710b as the set of operation parameters 1710 to operate the depth imaging system 1700 (e.g. the one or more depth images sensors 1702) in the second operation mode 1702b. Illustratively, the set of operation parameters 1710 may be switched alternatingly between the first set of predefined parameters 1710a and the second set of predefined parameters 1710b to generate either depth images of a first type 1720a or depth images of a second type 1720b.

According to various aspects, the first set of predefined parameters 1710a may represent a strict operation mode (also referred to as high accuracy operation mode). The parameters of the first set of predefined parameters 1710a may be set to provide depth images of a first type 1720a including only high confidence depth values. Therefore, according to various aspects, depth images of a first type 1720a generated based on the first set of predefined parameters 1710a may have a lower fill factor than depth images of the second type 1720b generated based on the second set of predefined parameters 1710b. According to various aspects, the fill factor may represent a number of pixels of the depth images having a depth value associated therewith.

Figure 18A:
FIG. 18A and FIG. 18B show a first depth image and a second depth image of the same scene, according to various aspects.
Figure 18B:
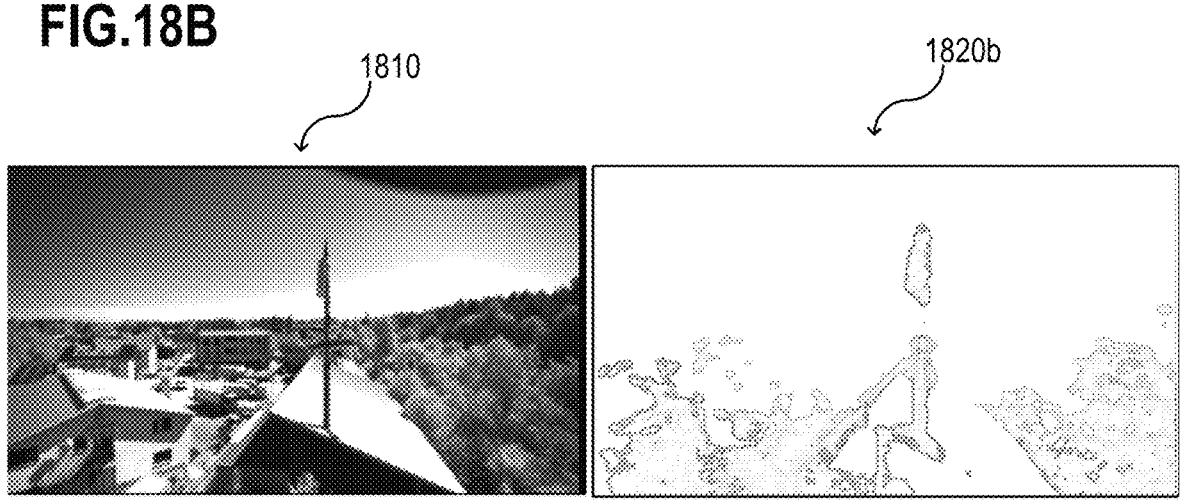

FIG. 18A shows a first depth image 1820a of a scene 1810, according to various aspects. The first depth image 1820a is generated based on the first set of predefined parameters 1710a. As a comparison, FIG. 18B shows a second depth image 1820b of the same scene 1810, the second depth image 1820b being generated based on the second set of predefined parameters 1710b. As illustrated in FIG. 18A, fake depth entries are avoided by generating the depth image 1820a (or depth map) with the strict settings. However, many valid values may be lost as well. In contrast, the more relaxed settings, as illustrated in FIG. 18B may allow a determination of more details on the costs of some fake depth information.

Figure 19:
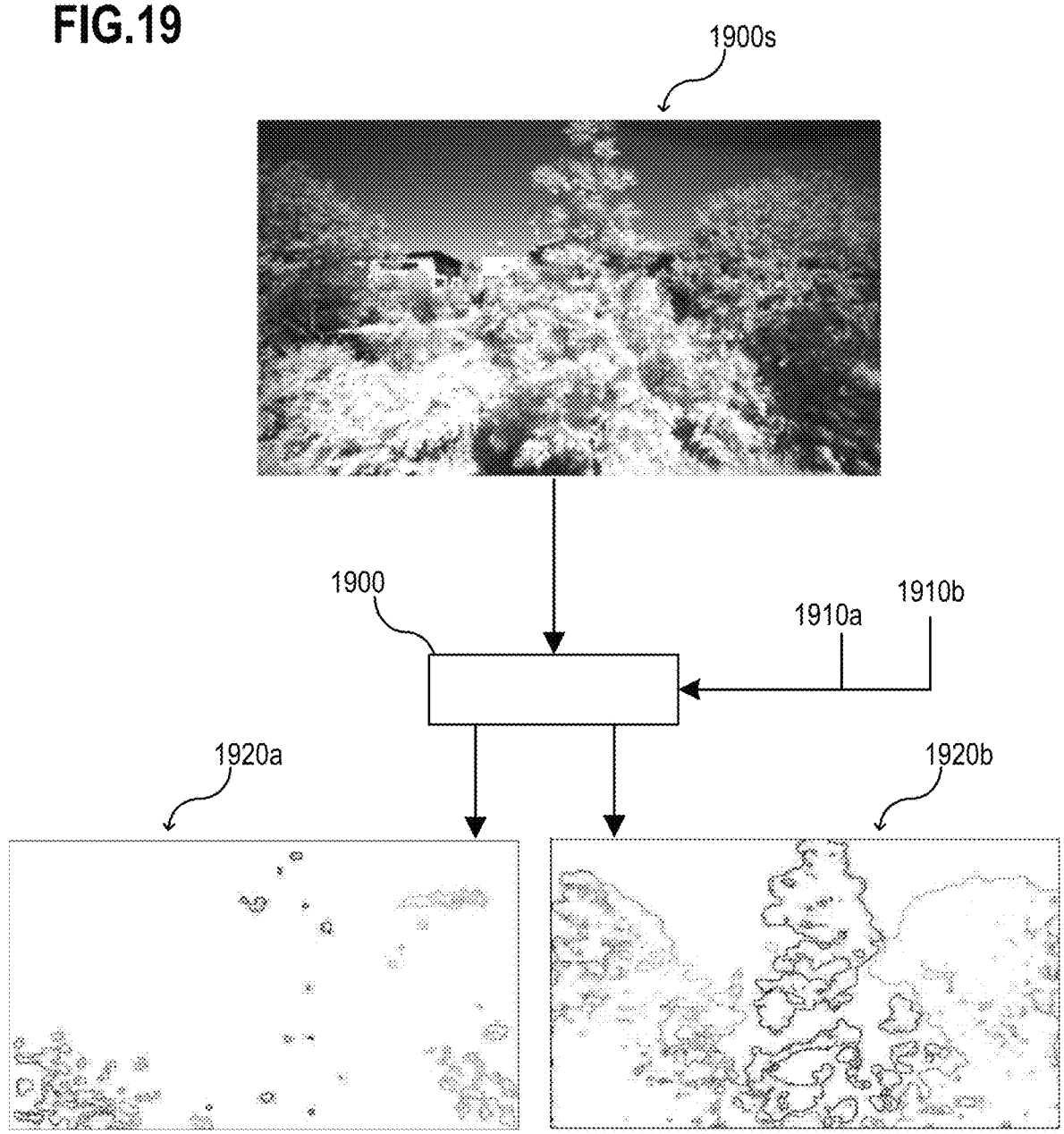
FIG. 19 shows exemplarily an operation of a depth camera, according to various aspects.

FIG. 19 shows exemplarily an operation of a depth camera 1900 generating one or more first depth images 1920a of a first type based on a first set of pre-defined visual parameters 1910a and one or more second depth images 1920b of a second type based on a second set of pre-defined visual parameters 1910b. Different types of depth images 1920a, 1920b may be generated from the same scene 1900s in a hybrid depth sensing mode to obtain detailed information about the scene 1900s that are not impacted by fake depth information. According to various aspects, the depth camera 1900 may be operated based on the first set of pre-defined visual parameters 1910a (e.g. strict settings) for a predefined time interval (e.g. for 30 to 70 frames at a frame rate of 30 frames per second). Subsequently, the depth camera 1900 may be operated based on the second set of pre-defined visual parameters 1910b (e.g. less strict or, in other words, relaxed settings) that give more detail, but might have fake depth information. According to various aspects, the depth camera 1900 may be operated based on the second set of pre-defined visual parameters 1910b for a predefined time interval (e.g. for 1 to 10 frames at a frame rate of 30 frames per second). According to various aspects, the frame rate may be varied, e.g. the frame rate may be in the range from about 10 frames per second to about 70 frames per second.

According to various aspects, a filtering may be applied to the sequence of depth images 1920a, 1920b. According to various aspects, the number of depth images generated for the sequence may be selected to get rid of fake depth inputs and at the same time maintain enough detail about the vicinity to be monitored.

The proposed method may work also with multiple cameras on a single vehicle, e.g. on a single drone. When using depth sensors other than an Intel® RealSense™ Depth Camera, a hybrid depth sensing mode may be still the right solution for obstacle detection.

Figure 20:
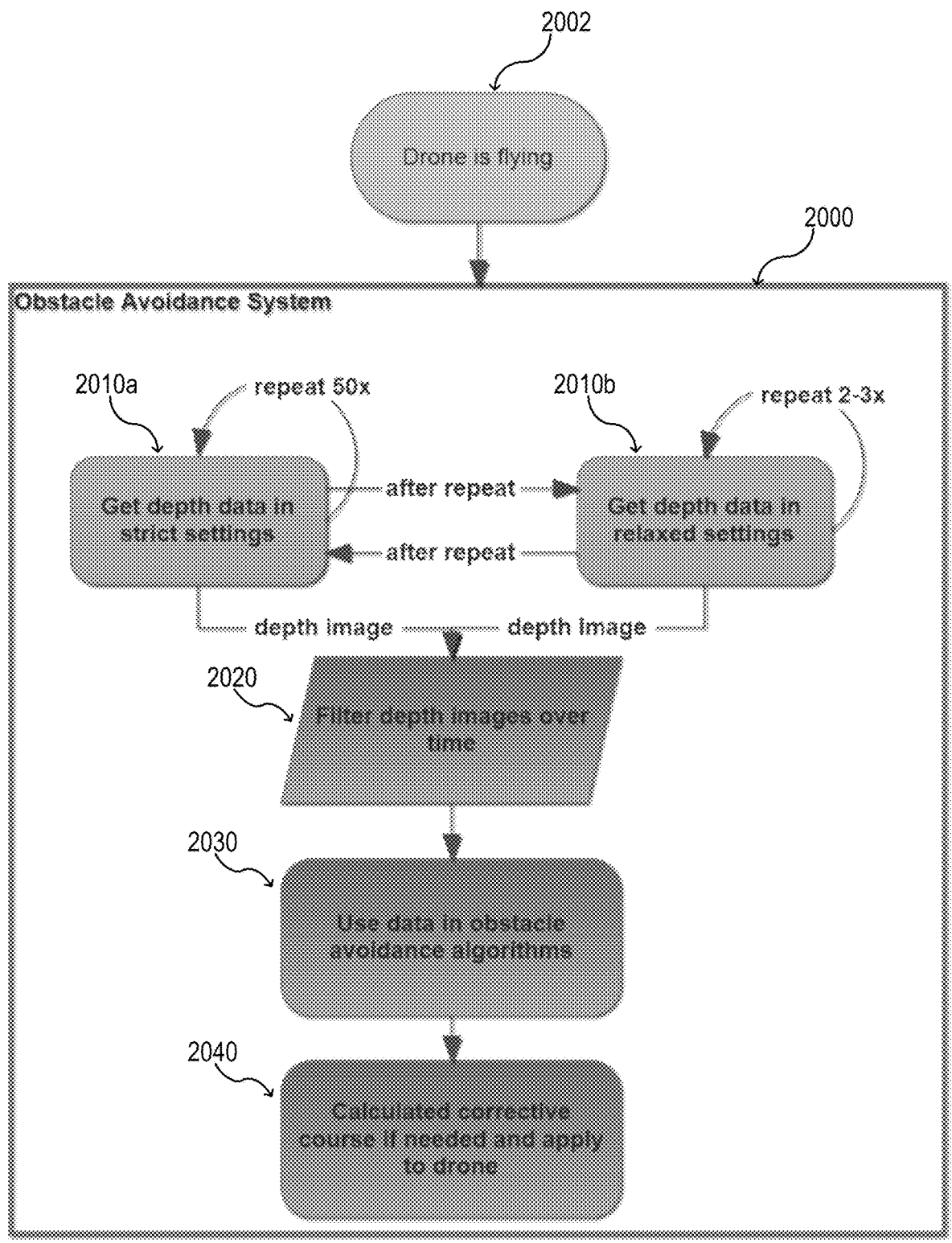
FIG. 20 shows various functions of an obstacle avoidance system in a schematic view, according to various aspects.

FIG. 20 shows various functions of an obstacle avoidance system 2000 in a schematic view, according to various aspects. The obstacle avoidance system 2000 may be implemented in a drone 2002 or any other suitable vehicle. As an example, one or more processors of a drone may be configured to carry out the functions that are described herein with respect to the obstacle avoidance system 2000.

According to various aspects, the obstacle avoidance system 2000 may be configured to generate (in 2010a) a plurality of depth images from depth data obtained in first (e.g. strict) settings and (in 2010b) a plurality of depth images from depth data obtained in second (e.g. relaxed) settings.

The obstacle avoidance system 2000 may be further configured (in 2020) to filter the depth images over time. According to various aspects, a filter (such as a median filter) may be applied to the respectively generated depth image before the depth image is provided to an obstacle avoidance algorithm. In some aspects, one or more of the depth images may be superimposed with one another. In some aspects, the filtering of the depth images may be optional.

The obstacle avoidance system 2000 may be further configured (in 2030) to detect one or more obstacles based on the received depth images. The depth images may be provided as a time resolved series to any suitable obstacle detection and/or avoidance algorithm. In some aspects, the obstacle detection and/or avoidance algorithm may include generating a map (e.g. a voxel map) based on the received time resolved series of depth images. The map may be generated via the obstacle map generator or the method for generating an obstacle map, as described herein, for example, with reference to FIGS. 10, 11, 12, 13A to 13C, and 14A to 14C. In some aspects, based on the depth images generated based on the first (e.g. strict) settings a ray-tracing function (see, for example, FIG. 13B) may be used to remove fake depth information introduced by the depth images generated from depth data obtained based on the second (e.g. relaxed) settings.

The obstacle avoidance system 2000 may be further configured (in 2040) to determine (e.g. calculate) a corrective course if necessary to avoid a collision and apply the corrective course to the drone.

According to various aspects, any other suitable obstacle detection and/or avoidance algorithm may be used to control the drone based in the generated depth images.

Figure 21:
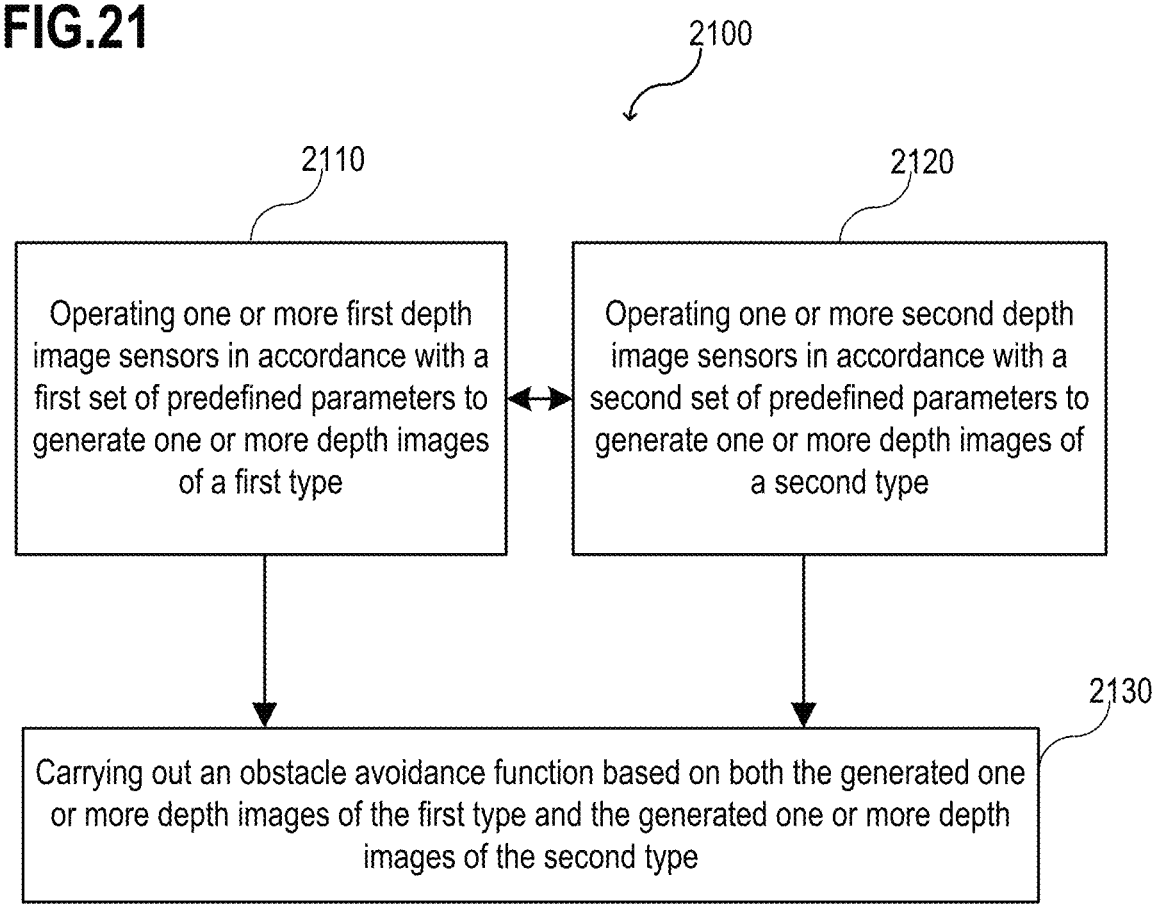
FIG. 21 shows a schematic flow diagram of a method for operating a depth imaging system, according to various aspects.

FIG. 21 shows a schematic flow diagram of a method 2100 for operating a depth imaging system, according to various aspects. The method 2100 may include: in 2110, operating one or more first depth image sensors in accordance with a first set of predefined parameters to generate one or more depth images of a first type; in 2120, operating one or more second depth image sensors in accordance with a second set of predefined parameters to generate one or more depth images of a second type; and, in 2130, carrying out an obstacle avoidance function based on both the generated one or more depth images of the first type and the generated one or more depth images of the second type.

According to various aspects, one or more parameters of the first (e.g. strict) settings of an Intel® RealSense™ Depth Camera may be as follows:
"controls-autoexposure-auto": "True",
"controls-autoexposure-manual": "8500",
"controls-depth-gain": "16",
"controls-laserpower": "150",
"controls-laserstate": "on",
"ignoreSAD": "0",
"param-autoexposure-setpoint": "2000",
"param-censusenablereg-udiameter": "9",
"param-censusenablereg-vdiameter": "9",
"param-censususize": "9",
"param-censusysize": "9",
"param-depthclampmax": "65536",
"param-depthclampmin": "0",
"param-depthunits": "1000",
"param-disableraucolor": "0",
"param-disablesadcolor": "0",
"param-disablesadnormalize": "0",
"param-disablesloleftcolor": "0",
"param-disableslorightcolor": "1",
"param-disparitymode": "0",
"param-disparityshift": "0",
"param-lambdaad": "751",
"param-lambdacensus": "6",
"param-leftrightthreshold": "10",
"param-maxscorethreshb": "2893",
"param-medianthreshold": "796",
"param-minscorethresha": "4",
"param-neighborthresh": "108",
"param-raumine": "6",
"param-rauminn": "3",
"param-rauminnssum": "7",
"param-raumins": "2",
"param-rauminw": "2",
"param-rauminwesum": "12",
"param-regioncolorthresholdb": "0.785714",
"param-regioncolorthresholdg": "0.565558",
"param-regioncolorthresholdr": "0.985323",
"param-regionshrinku": "3",
"param-regionshrinkv": "0",
"param-robbinsmonrodecrement": "25",
"param-robbinsmonroincrement": "2",
"param-rsmdiffthreshold": "1.65625",
"param-rsmrauslodiffthreshold": "0.71875",
"param-rsmremovethreshold": "0.4",
"param-scanlineedgetaub": "13",
"param-scanlineedgetaug": "15",
"param-scanlineedgetaur": "30",
"param-scanlinep1": "155",
"param-scanlinep1onediscon": "160",
"param-scanlinep1twodiscon": "59",
"param-scanlinep2": "70",
"param-scanlinep2onediscon": "20",
"param-scanlinep2twodiscon": "493",
"param-secondpeakdelta": "647",
"param-texturecountthresh": "4",
"param-texturedifferencethresh": "50",
"param-usersm": "1", and/or
"param-zunits": "1000".

According to various aspects, one or more parameters of the second (e.g. relaxed) settings of an Intel® RealSense™ Depth Camera may be as follows:
"controls-autoexposure-auto": "True",
"controls-autoexposure-manual": "8500",
"controls-depth-gain": "16",
"controls-laserpower": "150",
"controls-laserstate": "on",
"ignoreSAD": "0",
"param-autoexposure-setpoint": "2000",
"param-censusenablereg-udiameter": "9",
"param-censusenablereg-vdiameter": "9", "param-censususize": "9",
"param-censusysize": "9",
"param-depthclampmax": "65536",
"param-depthclampmin": "0",
"param-depthunits": "1000",
"param-disableraucolor": "0",
"param-disablesadcolor": "0",
"param-disablesadnormalize": "0",
"param-disablesloleftcolor": "0",
"param-disableslorightcolor": "1",
"param-disparitymode": "0",
"param-disparityshift": "0",
"param-lambdaad": "751",
"param-lambdacensus": "6",
"param-leftrightthreshold": "18",
"param-maxscorethreshb": "2047",
"param-medianthreshold": "550",
"param-minscorethresha": "80",
"param-neighborthresh": "263",
"param-raumine": "6",
"param-rauminn": "3",
"param-rauminnssum": "7",
"param-raumins": "2",
"param-rauminw": "2",
"param-rauminwesum": "12",
"param-regioncolorthresholdb": "0.785714",
"param-regioncolorthresholdg": "0.565558",
"param-regioncolorthresholdr": "0.985323",
"param-regionshrinku": "3",
"param-regionshrinkv": "0",
"param-robbinsmonrodecrement": "15",
"param-robbinsmonroincrement": "5",
"param-rsmdiffthreshold": "1.65625",
"param-rsmrauslodiffthreshold": "0.71875",
"param-rsmremovethreshold": "0.4",
"param-scanlineedgetaub": "13"
"param-scanlineedgetaug": "15",
"param-scanlineedgetaur": "30",
"param-scanlinep1": "155",
"param-scanlinep1onediscon": "160",
"param-scanlinep1twodiscon": "59",
"param-scanlinep2": "70",
"param-scanlinep2onediscon": "20",
"param-scanlinep2twodiscon": "493",
"param-secondpeakdelta": "450",
"param-texturecountthresh": "4",
"param-texturedifferencethresh": "50",
"param-usersm": "1", and/or
"param-zunits": "1000".

In some aspects, similar or other parameters may be determined that represent either strict settings or relaxed settings.

In the following, various examples are described that may refer to one or more aspects described herein, e.g. to one or more aspects of the depth imaging system and/or the collision avoidance system described with reference to FIGS. 15 to 21.

Example 1 is a depth imaging system, including: one or more depth image sensors configured to generate depth images in accordance with a set of operation parameters; one or more memories including a first set of predefined parameters associated with a first operation mode of the one or more depth sensors and a second set of predefined parameters associated with a second operating mode of the one or more depth sensors; and one or more processors configured to alternatingly select the first set of predefined parameters as the set of operation parameters or the second set of predefined parameters as the set of operation parameters to alternatingly operate the one or more depth images sensors in the first operation mode and in the second operation mode.

In Example 2, the depth imaging system of example 1 may optionally further include that the one or more processors are further configured to superimpose one or more first depth images generated in the first operation mode with one or more second depth images generated in the second operation mode.

In Example 3, the depth imaging system of example 1 or 2 may optionally further include that the one or more processors are further configured to superimpose one or more first depth images generated in the first operation mode with one another and/or to superimpose one or more second depth images generated in the second operation mode with one another.

In Example 4, the depth imaging system of any one of examples 1 to 3 may optionally further include that the one or more processors are further configured to select the first set of predefined parameters for a predefined first time interval and the second set of predefined parameters for a predefined second time interval.

In Example 5, the depth imaging system of example 4 may optionally further include that the first time interval is greater than the second time interval.

In Example 6, the depth imaging system of any one of examples 1 to 5 may optionally further include that the one or more processors are further configured to apply a filter on one or more first depth images generated in the first operation mode and/or one on or more second depth images generated in the second operation mode.

In Example 7, the depth imaging system of example 6 may optionally further include that the filter is a median filter.

In Example 8, the depth imaging system of any one of examples 1 to 7 may optionally further include that a depth image of a scene generated based on the first set of predefined parameters includes less pixels having a depth value associated therewith than a depth image of the scene generated based on the second set of predefined parameters.

In Example 9, the depth imaging system of any one of examples 1 to 8 may optionally further include that the one or more processors are further configure to provide the generated depth images to an obstacle map generator.

Example 10 is a collision avoidance system, including a depth imaging system of any one of examples 1 to 9 configured to generate depth images. The collision avoidance system of example 10 may optionally further include one or more processors configured to generate a collision free path of movement based on the generated depth images.

Example 11 is a collision avoidance system, including a depth imaging system of any one of examples 1 to 9 configured to generate depth images. The collision avoidance system of example 11 may optionally further include one or more processors configured to generate a voxel map based on depth images, determine, for one or more voxel positions of the voxel map, an occupancy value, the respective occupancy value representing a probability of the presence of an obstacle at an absolute position corresponding to the respective voxel position, and generate a collision free path of movement based on the generated voxel map.

Example 12 is a vehicle, including a collision avoidance system of example 10 or 11 to generate a collision free path of movement. The vehicle of example 12 may optionally further include one or more processors configured to control movement of the vehicle based on the generated collision free path of movement.

Example 13 is a method for generating an obstacle map, the method including: generating depth images via a depth imaging system according to any one of examples 1 to 9. The method of example 13 may optionally further include generating a voxel map based on the generated depth images.

In example 14, the method of example 13 may optionally further include: determining, for one or more voxel positions of the voxel map, an occupancy value, the respectively determined occupancy value representing a probability of the presence of an obstacle at an absolute position corresponding to a voxel position in the voxel map.

In example 15, the method of example 14 may optionally further include that the determination of the respective occupancy value includes: determining a first voxel position representing the absolute position of the obstacle; determining a second voxel position representing an absolute position of a viewpoint associated with the depth map; determining one or more intermediate voxel positions between the first voxel position and the second voxel position; and determining an intermediate occupancy value for each of the one or more intermediate voxel positions, the respective intermediate occupancy value representing a probability of the presence of an obstacle at an absolute position corresponding to the intermediate voxel position.

Example 16 is a method for operating a depth imaging system, the method including: alternatingly operating one or more depth image sensors in accordance with a first set of predefined parameters and a second set of predefined parameters to generate one or more depth images of a first type and one or more depth images of a second type accordingly.

In example 17, the method of example 16 may optionally further include: superimposing one or more depth images of the first type with one or more depth images generated of the second type.

In example 18, the method of example 16 or 17 may optionally further include: superimposing one or more depth images of the first type with one another and/or superimposing one or more depth images generated of the second type with one another.

In example 19, the method of any one of examples 16 to 18 may optionally further include that alternatingly operating the one or more depth image sensors includes: operating the one or more depth image sensors in accordance with the first set of predefined parameters for a first predefined time interval; and operating the one or more depth image sensors in accordance with the second set of predefined parameters for a second predefined time interval, wherein the first time interval is different from the second time interval.

In example 20, the method of example 19 may optionally further include that the first time interval is greater than the second time interval.

In example 21, the method of any one of examples 16 to 20 may optionally further include: applying a filter on one or more depth images of the first type and/or on one or more depth images of the second type.

In example 22, the method of example 21 may optionally further include that the filter is a median filter.

In example 23, the method of any one of examples 16 to 22 may optionally further include that a depth image of the first type that images a scene includes less pixels having a depth value associated therewith than a depth image of the second type that images the scene.

In example 24, the method of any one of examples 16 to 23 may optionally further include: providing the generated depth images of the first type and the second type to an obstacle map generator.

Example 25 is a collision avoidance method including operating a depth imaging system in accordance with any one of examples 16 to 24 to generate depth images. The method of example 25 may optionally further include generating a collision free path of movement based on the generated depth images.

Example 26 is a collision avoidance method including operating a depth imaging system in accordance with any one of examples 16 to 24 to generate depth images. The method of example 26 may optionally further include generating a voxel map based on the generated depth images and generating a collision free path of movement based on the generated voxel map.

Example 27 is a method for operating a vehicle, the method including: operating a depth imaging system in accordance with any one of examples 16 to 24 to generate depth images. The method of example 27 may optionally further include: generating a collision free path of movement based on the generated depth images; and controlling movement of the vehicle based on the generated collision free path of movement.

Example 28 is a method for operating a vehicle, the method including: operating a depth imaging system in accordance with any one of examples 16 to 24 to generate depth images. The method of example 28 may optionally further include: generating a voxel map based on the generated depth images; and controlling movement of the vehicle based on the generated voxel map.

Example 29 is a method for operating a depth imaging system, the method including: operating one or more first depth image sensors in accordance with a first set of predefined parameters to generate one or more depth images of a first type; operating one or more second depth image sensors in accordance with a second set of predefined parameters to generate one or more depth images of a second type; and carrying out an obstacle avoidance function based on both the generated one or more depth images of the first type and the generated one or more depth images of the second type.

In example 30, the method of example 29 may optionally further include that the generated one or more depth images of the second type include a greater fill factor than the generated one or more depth images of the first type.

In example 31, the method of example 29 or 30 may optionally further include that the generated one or more depth images of the first type include a smaller number of incorrect depth value than the generated one or more depth images of the second type.

Example 32 is a collision avoidance method including: operating one or more first depth image sensors in accordance with a two sets of predefined parameters to generate one or more depth images of a first type and one or more depth images of a second type, the two sets of predefined parameters being distinct from an another; and carrying out an obstacle avoidance function based on both the generated one or more depth images of the first type and the generated one or more depth images of the second type.

In example 33, the method of example 32 may optionally further include that the generated one or more depth images of the second type include a greater fill factor than the generated one or more depth images of the first type.

In example 34, the method of example 32 or 33 may optionally further include that the generated one or more depth images of the first type include a smaller number of incorrect depth value than the generated one or more depth images of the second type.

According to various aspects, generating a depth map (or depth image) from stereo images or multi-view images may include various parameters and/or criteria that may have an influence on the confidence of the resulting matches and depth values associated therewith. According to various aspects, the first set of predefined parameter and the second set of predefined parameter (e.g. the relaxed and strict settings) may differ in at least one of the following parameters:

color: in the case that a feature in one of the images has a different color than in another one of the images, the likelihood that these features represent the same object may be reduced so that the corresponding depth value may be more likely invalid; and/or
  contrast and/or brightness: in the case that a feature in one of the images has a different brightness than in another one of the images, the likelihood that these features represent the same object may be reduced so that the corresponding depth value may be more likely invalid.

It has to be noted that slight differences in color and/or brightness may naturally occur, e.g. due to a difference in auto-exposure results, a difference in the quality of the camera sensors, the different view (since it is a stereo view) with respect to the object.

According to various aspects, a possible feature may be barely visible. In this case, the confidence associated with this feature may be small since it may be not clear whether this feature is a correct match or not. As an example, a pixel with a grey value of 200 may be located within a white area (e.g. the white are may represent a white wall) and other pixels in the white area have a grey value in the greyscale range from about 198 to about 202 as well. In contrast, a possible feature may be clearly visible. In this case, the confidence associated with this feature may be great since it may be very likely that this feature is a correct match. As an example, a dark object (e.g. a corner or edge of a building) in front of a bright background (e.g. the sky at daylight) may be unambiguously detected in the corresponding images.

According to various aspects, it may be predefined along which directions the stereo matches have to be identified. As an example, in the case that an object shall be inspected that may have substantially a homogeneous color in the horizontal direction but detectable structure differences in the vertical direction, the vertical direction may be used preferentially to detect stereo matches.

According to various aspects, it may be determined whether the calculated depth value is outside a pre-defined depth interval, (e.g. below 50 cm and/or greater than 100 m). As an example, the confidence associated with a depth value may be low if the depth values are outside the pre-defined interval, since, for example, this may be a hint that the depth camera may not work properly.

According to various aspects, in the case that one pixel in one of the stereo images may correspond to more than one pixel in the other one of the stereo images, the abovementioned aspects may be used to determine a best match by varying the parameters and/or criteria.

According to various aspects, different colors may be used for the determination of stereo matches or the colors used for the determination of stereo matches may be weighted in terms of confidence. As an example, a pixel of a first color (e.g. green) may be considered more confident than a pixel of a second color (e.g. blue). The colors may be weighted in dependence of the characteristics of the desired operating area, e.g. if an operation is planned in an area being dominated by trees, grass, and/or other plants or green objects, one or more green color values may be considered to be more confident than other color values.

Further, a hole filling function may be used, where, for example, a center pixel of a 3×3-pixel array may be filled with the same color as the pixels surrounding the center pixel. However, in this case, the center pixel may be considered as less confident due to the used interpolation.

In general, the strict setting may be selected in such a way that depth values are generated only from stereo matches having a comparatively high confidence, wherein the relaxed settings may be selected in such a way that depth values are generated from stereo matches having a lower confidence compared to the strict settings.

According to various aspects, all types of cameras may be used to generate stereo images (e.g. based on two different viewing angles) or multi-view images (e.g. based on more than two different viewing angles).

In some aspects, any method described herein may be partially or completely implemented as a non-transitory computer readable medium with program instructions, which when executed, cause one or more processors to perform at least a portion or all of the method.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An unmanned aerial vehicle, comprising:
  one or more depth imaging sensors configured to provide a depth image of a vicinity of the unmanned aerial vehicle; and
  one or more processors configured to:
    generate a spherical map from a perspective of the unmanned aerial vehicle,
    map the depth image to the spherical map, the spherical map comprising a set of directions and a depth value assigned to each direction of the set of directions,
    determine, from the spherical map, a first obstacle located within a first predetermined distance range of the unmanned aerial vehicle and movement information associated with the first obstacle, the first predetermined distance range being defined with respect to the unmanned aerial vehicle and having a maximal distance from the unmanned aerial vehicle,
    determine, from the spherical map, a second obstacle located within a second predetermined distance range of the unmanned aerial vehicle and movement information associated with the second obstacle, the second predetermined distance range being defined with respect to the unmanned aerial vehicle and having a maximal distance from the unmanned aerial vehicle,
    determine a virtual force vector based on at least one of the movement information associated with the first obstacle or the movement information associated with the second obstacle, and
    control flight of the unmanned aerial vehicle based on the virtual force vector to avoid a collision of the unmanned aerial vehicle with the first obstacle and the second obstacle, wherein the maximal distance of the first predetermined distance range is closer to the unmanned aerial vehicle than the maximal distance of the second predetermined distance range.

2. The unmanned aerial vehicle of claim 1,
wherein the one or more processors are configured to determine the first obstacle located within the first predetermined distance range of the unmanned aerial vehicle by
  detecting a first plurality of obstacles located within the first predetermined distance range of the unmanned aerial vehicle, and
  determining a first candidate obstacle, from among the first plurality of obstacles, with a shortest distance to the unmanned aerial vehicle, the first obstacle being the first candidate obstacle; and/or
wherein the one or more processors are configured to determine the second obstacle located within the second predetermined distance range of the unmanned aerial vehicle by
  detecting a second plurality of obstacles located within the second predetermined distance range of the unmanned aerial vehicle, and
  determining a second candidate obstacle, from among the second plurality of obstacles, with a shortest distance to the unmanned aerial vehicle, the second obstacle being the second candidate obstacle.

3. The unmanned aerial vehicle of claim 1,
wherein the one or more processors are configured to control of the flight of the unmanned aerial vehicle by controlling the unmanned aerial vehicle to increase a distance from the unmanned aerial vehicle to at least one of the first obstacle or the second obstacle.

4. The unmanned aerial vehicle of claim 1,
wherein the one or more processors are configured to control of the flight of the unmanned aerial vehicle by controlling the unmanned aerial vehicle to generate a propulsion based on the virtual force vector.

5. The unmanned aerial vehicle of claim 1,
wherein the one or more processors are further configured to deactivate the determination of the second obstacle located within the second predetermined distance range of the unmanned aerial vehicle, and
wherein the one or more processors are configured to determine the virtual force vector only based on the movement information associated with the first obstacle.

6. The unmanned aerial vehicle of claim 1,
wherein each respective movement information, from among the movement information associated with the first obstacle and the movement information associated with the second obstacle, comprises a relative position of a respective obstacle,
wherein the respective obstacle is the first obstacle in the case that the respective movement information pertains to the movement information associated with the first obstacle, and
wherein the respective obstacle is the second obstacle in the case that the respective movement information pertains to the movement information associated with the second obstacle.

7. The unmanned aerial vehicle of claim 6,
wherein the one or more processors are further configured to:
  perform the determination of the respective movement information at predefined time intervals, and
  limit a change of the relative position of the respective object over time to a maximal rate.

8. The unmanned aerial vehicle of claim 1,
wherein each respective movement information, from among the movement information associated with the first obstacle and the movement information associated with the second obstacle, comprises a relative velocity of a respective obstacle, and/or a parameter representing whether the respective obstacle approaches the unmanned aerial vehicle,
wherein the respective obstacle is the first obstacle in the case that the respective movement information pertains to the movement information associated with the first obstacle, and
wherein the respective obstacle is the second obstacle in the case that the respective movement information pertains to the movement information associated with the second obstacle.

9. The unmanned aerial vehicle of claim 1,
wherein one or more processors are configured to determine respective movement information, from among the movement information associated with the first obstacle and the movement information associated with the second obstacle, via a tracking filter.

10. The unmanned aerial vehicle of claim 9,
wherein the tracking filter is a Kalman filter,
wherein the Kalman filter comprises a predefined movement model to predict movement of a respective obstacle,
wherein the respective obstacle is the first obstacle in the case that the respective movement information pertains to the movement information associated with the first obstacle, and
wherein the respective obstacle is the second obstacle in the case that the respective movement information pertains to the movement information associated with the second obstacle.

11. The unmanned aerial vehicle of claim 1,
wherein the one or more processors are configured to determine the virtual force vector based on the movement information associated with the first obstacle,
wherein the one or more processors are further configured to determine a scaling factor for the virtual force vector based on how recent the first obstacle was detected by the unmanned aerial vehicle,
wherein the one or more processors are configured to control flight of the unmanned aerial vehicle based on the virtual force vector and the scaling factor for the virtual force vector.

12. A collision avoidance method, comprising:
receiving depth information of one or more depth imaging sensors of an unmanned aerial vehicle;
determining, from the depth information, a first obstacle located within a first predetermined distance range of the unmanned aerial vehicle and movement information associated with the first obstacle, the first predetermined distance range being defined with respect to the unmanned aerial vehicle and having a maximal distance from the unmanned aerial vehicle;
determining, from the depth information, a second obstacle located within a second predetermined distance range of the unmanned aerial vehicle and movement information associated with the second obstacle, the second predetermined distance range being defined with respect to the unmanned aerial vehicle and having a maximal distance from the unmanned aerial vehicle, determining a virtual force vector based on at least one of the movement information associated with the first obstacle or the movement information associated with the second obstacle, and controlling flight of the unmanned aerial vehicle based on the virtual force vector to avoid a collision of the unmanned aerial vehicle with the first obstacle and the second obstacle, wherein the maximal distance of the first predetermined distance range is closer to the unmanned aerial vehicle than the maximal distance of the second predetermined distance range.

13. The method of claim 12, wherein determining the first obstacle located within the first predetermined distance range of the unmanned aerial vehicle comprises:
- detecting a first plurality of obstacles located within the first predetermined distance range of the unmanned aerial vehicle, and
- determining a first candidate obstacle, of the first plurality of obstacles, with a shortest distance to the unmanned aerial vehicle, the first obstacle being the first candidate obstacle; and/or wherein determining the second obstacle located within the first predetermined distance range of the unmanned aerial vehicle comprises:
- detecting a second plurality of obstacles located within the second predetermined distance range of the unmanned aerial vehicle, and
- determining a second candidate obstacle, of the second plurality of obstacles, with a shortest distance to the unmanned aerial vehicle, the second obstacle being the second candidate obstacle.

14. The method of claim 12, further comprising:

deactivating the determination of the second obstacle located within the second predetermined distance range of the unmanned aerial vehicle, wherein determining the virtual force vector comprises:
- determining the virtual force vector only based on the movement information associated with the first obstacle.

15. The method of claim 12, wherein each respective movement information, from among the movement information associated with the first obstacle and the movement information associated with the second obstacle, comprises a relative position of a respective obstacle, wherein the respective obstacle is the first obstacle in the case that the respective movement information pertains to the movement information associated with the first obstacle, and wherein the respective obstacle is the second obstacle in the case that the respective movement information pertains to the movement information associated with the second obstacle.

16. The method of claim 15, further comprising:

performing the determination of the respective movement information at predefined time intervals; and limiting a change of the relative position of the respective object over time to a maximal rate.

17. The method of claim 12, wherein each respective movement information, from among the movement information associated with the first obstacle and the movement information associated with the second obstacle, comprises a relative velocity of a respective obstacle, and/or a parameter representing whether the respective obstacle approaches the unmanned aerial vehicle, wherein the respective obstacle is the first obstacle in the case that the respective movement information pertains to the movement information associated with the first obstacle, and wherein the respective obstacle is the second obstacle in the case that the respective movement information pertains to the movement information associated with the second obstacle.

18. The method of claim 12, wherein determining respective movement information, from among the movement information associated with the first obstacle and the movement information associated with the second obstacle, is performed via a tracking filter.

19. The method of claim 18, wherein the tracking filter is a Kalman filter, wherein the Kalman filter comprises a predefined movement model to predict movement of a respective obstacle, wherein the respective obstacle is the first obstacle in the case that the respective movement information pertains to the movement information associated with the first obstacle, and wherein the respective obstacle is the second obstacle in the case that the respective movement information pertains to the movement information associated with the second obstacle.

20. The method of claim 12, further comprising:

determining a scaling factor for the virtual force vector based on how recent the first obstacle was detected by the unmanned aerial vehicle, wherein determining the virtual force vector comprises determining the virtual force vector based on the movement information associated with the first obstacle, wherein controlling flight of the unmanned aerial vehicle comprises controlling flight of the unmanned aerial vehicle based on the virtual force vector and the scaling factor for the virtual force vector.

* * * * *